US012663780B2

(12) United States Patent
Otaki et al.

(10) Patent No.: US 12,663,780 B2
(45) Date of Patent: Jun. 23, 2026

(54) INFORMATION PROCESSING DEVICE, SUBSTRATE PROCESSING DEVICE, AND INFORMATION PROCESSING METHOD

(71) Applicant: EBARA CORPORATION, Tokyo (JP)

(72) Inventors: Hirofumi Otaki, Tokyo (JP); Sho Ichinose, Tokyo (JP); Takamasa Nakamura, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 343 days.

(21) Appl. No.: 18/595,463

(22) Filed: Mar. 5, 2024

(65) Prior Publication Data

US 2024/0302817 A1 Sep. 12, 2024

(30) Foreign Application Priority Data

Mar. 10, 2023 (JP) ................................. 2023-037778

(51) Int. Cl.
*G05B 19/4099* (2006.01)
(52) U.S. Cl.
CPC .................... *G05B 19/4099* (2013.01); *G05B 2219/45031* (2013.01); *G05B 2219/45232* (2013.01)
(58) Field of Classification Search
CPC .. G05B 2219/4099; G05B 2219/45031; G05B 2219/45232
See application file for complete search history.

(56) References Cited

U.S. PATENT DOCUMENTS

| | | | | |
|---|---|---|---|---|
| 2007/0123047 A1* | 5/2007 | Shirasu | .................. | B24B 37/30 |
| | | | | 438/692 |
| 2009/0132078 A1* | 5/2009 | Sakano | ............ | G05B 19/41875 |
| | | | | 700/103 |
| 2015/0290766 A1* | 10/2015 | Sugiyama | ............. | B24B 53/007 |
| | | | | 451/444 |
| 2018/0001440 A1* | 1/2018 | Aono | .................... | B24B 37/345 |
| 2018/0350638 A1* | 12/2018 | Kaga | .................. | H10P 72/0434 |

FOREIGN PATENT DOCUMENTS

| | | |
|---|---|---|
| JP | 2004265906 | 9/2004 |

* cited by examiner

*Primary Examiner* — Gertrude Arthur Jeanglaude
(74) *Attorney, Agent, or Firm* — JCIPRNET

(57) ABSTRACT

An information processing device generates a substrate processing schedule for sequentially performing respective processes on a predetermined number of substrates in a substrate processing device. The information processing device includes a substrate processing time acquisition part which acquires polishing time and finishing time based on recipe information; a transport processing time acquisition part which acquires transport time; and a schedule generation part which generates a substrate processing schedule by setting a processing order condition, a simultaneous processing condition, a transfer processing priority condition which specifies that a pre-polishing transfer process is prioritized over a post-polishing transfer process as constraint conditions for mathematical optimization, setting final processing end time for a final substrate being the shortest as an objective function of the mathematical optimization, and performing the mathematical optimization which determines start timings of the respective processes.

8 Claims, 18 Drawing Sheets

22A(22B,22C,22D)

222d
222e
222b
222c
2200
222a
222
221a
221
221d
221b
W
221e
221c
224
224c
220c
220
224a
223d
220a
2230
223
223a
223b
224b
223c
220b
223e

INFORMATION PROCESSING DEVICE, SUBSTRATE PROCESSING DEVICE, AND INFORMATION PROCESSING METHOD

CROSS-REFERENCE TO RELATED APPLICATION

This application claims the priority benefits of Japanese application no. 2023-037778, filed on Mar. 10, 2023. The entirety of the above-mentioned patent application is hereby incorporated by reference herein and made a part of this specification.

BACKGROUND

Technical Field

The disclosure relates to an information processing device, a substrate processing device, and an information processing method.

Description of Related Art

As one of the substrate processing devices performing various processes on a substrate, such as a semiconductor wafer, a substrate processing device performing chemical mechanical polishing (CMP) is known. Such substrate processing device includes, for example, a polishing unit performing a polishing process on the substrate, a finishing unit performing a finishing process (e.g., a cleaning process or a drying process) on the substrate after the polishing process, and a transport unit performing a transport process that transports the substrate among the units, and is configured to execute a series of processes by operating the respective units in order (see, for example, Patent Document 1).

[Patent Document 1] Japanese Patent Application Laid-Open No. 2004-265906

In order to facilitate processing efficiency, a substrate processing device is configured to include, for example, multiple polishing units, multiple finishing units, and multiple transport units. Therefore, in a substrate processing device, when respective units are sequentially operated to process a predetermined number of substrates, it is needed to generate a substrate processing schedule for respective processes by appropriately determining the operating order and timings of the respective units so that the time at which the respective processes on all substrates end is the shortest. At that time, if the device configuration of the transport unit includes transport processes incapable of being executed simultaneously (for example, this applies to a post-polishing transfer process and a pre-polishing transfer process described below), the standby time for the substrate changes depending on which of the transport processes is prioritized and executed, so the evaluation index of the substrate processing schedule may deteriorate depending on the selection of the transport process to be prioritized.

The disclosure provides an information processing device, a substrate processing device, and an information processing method that allows a substrate processing schedule to be appropriately generated in the case where the device configuration of a transport unit includes transport processes incapable being executed simultaneously.

SUMMARY

An information processing device according to an embodiment of the disclosure generates a substrate processing schedule for sequentially performing respective processes on a predetermined number of substrates in a substrate processing device, the substrate processing device includes:

one or more polishing units which perform a polishing process on the substrate and are accessible to a polishing unit delivery position for delivering the substrate;

one or more finishing units which perform a finishing process on the substrate after the polishing process;

a first transport unit which performs a pre-polishing transport process that transports the substrate before the polishing process from a first transport start position to a first transport end position;

a second transport unit including multiple transport mechanisms which perform a pre-polishing loading process that transports the substrate before the polishing process from a transfer robot delivery position to the polishing unit delivery position, and a post-polishing unloading process that transports the substrate after the polishing process from the polishing unit delivery position to the transfer robot delivery position;

a third transport unit which performs a post-polishing transport process that transports the substrate after the polishing process from a third transport start position to the finishing unit;

a supply/discharge robot which performs a substrate supply process that takes out the substrate before the polishing process from a substrate cassette and supplies the substrate before the polishing process to the first transport unit and a substrate discharge process that receives the substrate after the finishing process from the finishing unit and storing the substrate after the finishing process in the substrate cassette; and a transfer robot which performs a pre-polishing transfer process that receives the substrate before the polishing process from the first transport unit at the first transport end position and delivers the substrate before the polishing process to the second transport unit at the transfer robot delivery position and a post-polishing transfer process that receives the substrate after the polishing process from the second transport unit at the transfer robot delivery position and delivers the substrate after the polishing process to the third transport unit at the third transport start position, and the information processing device includes:

a substrate processing time acquisition unit which acquires polishing time required for the polishing process and finishing time required for the finishing process based on recipe information indicating processing content of the polishing process and the finishing process;

a transport processing time acquisition part which acquires transport time required for each of the substrate supply process, the pre-polishing transport process, the pre-polishing transfer process, the pre-polishing loading process, the post-polishing unloading process, the post-polishing transfer process, the post-polishing transport process, and the substrate discharge process; and a schedule generation part which generates a substrate processing schedule by setting a processing order condition which determines order in which the respective processes are performed, a simultaneous processing condition which determines which processes are capable or incapable of being performed simultaneously among the respective processes, and a transfer processing priority condition which specifies that the pre-polishing transfer process is prioritized over the post-polishing transfer process as constraint conditions for mathematical optimization, setting final processing end time for the substrate of the last that includes the polishing time, the finishing time, and the transport time as variables as an objective function of the mathematical optimization, and performing the mathematical optimization which determines start timings of the respective processes.

Issues, configurations, and effects other than those described above will be made clear in the detailed description of the disclosure described below.

DESCRIPTION OF THE EMBODIMENTS

According to the information processing device according to an embodiment of the disclosure, the schedule generation part generates a substrate processing schedule by setting a processing order condition which determines order in which respective processes are performed, a simultaneous processing condition which determines which processes are capable or incapable of being performed simultaneously among the respective processes, and a transfer processing priority condition which specifies that a pre-polishing transfer process is prioritized over a post-polishing transfer process as a constraint condition for mathematical optimization, setting final processing end time for the substrate of the last that includes the polishing time, the finishing time, and the transport time as variables as an objective function of the mathematical optimization, and performing the mathematical optimization which determines start timings of the respective processes. Therefore, even if the pre-polishing transfer process and the post-polishing transfer process by a transfer robot are included as transport processes incapable of being executed simultaneously due to the device configuration of the transport unit, the substrate processing schedule reflects the transfer processing priority condition which specifies that the pre-polishing transfer process is prioritized over the post-polishing transfer process, and a substrate processing schedule can be generated appropriately.

Hereinafter, embodiments for carrying out the disclosure will be described with reference to the drawings. Below, the scope required for the description to achieve the objective of the disclosure will be schematically shown, the scope required for describing relevant portions of the disclosure will be mainly described, and parts where description is omitted will be based on conventional techniques.

Embodiment

Figure 1:
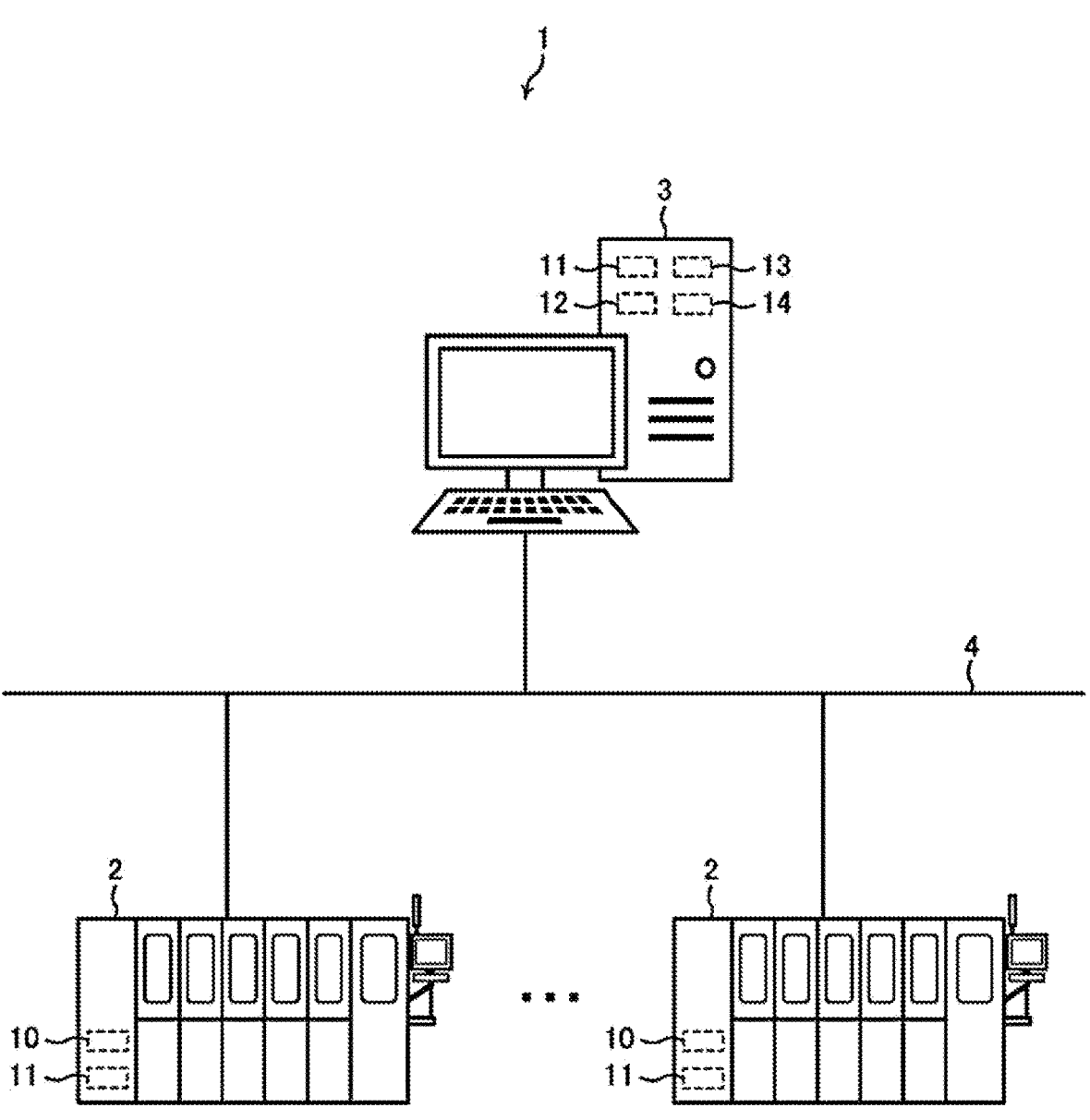
FIG. 1 is a view showing an overall configuration of an example of a substrate processing system 1.

FIG. 1 is a view showing an overall configuration of an example of a substrate processing system 1. The substrate processing system 1 according to the embodiment mainly includes a substrate processing device 2 and an information processing device 3, and is configured to be connected with a wired or wireless network 4 to be capable of transmitting and receiving various data with respect to each other. Note that the number of the substrate processing devices 2 and the information processing devices 3 and the connection configuration of the network 4 are not limited to the example shown in FIG. 1, and may be modified as appropriate.

The substrate processing device 2 includes a substrate processing unit (details will be described later) which performs various substrate processes on a substrate (hereinafter referred to as "wafer") W such as a semiconductor wafer and a transport processing unit (details will be described later) which transports the wafer W. In the embodiment, the substrate processing device 2 includes a polishing unit and a finishing unit as the substrate processing unit, and performs a chemical mechanical polishing process (hereinafter referred to as "polishing process"), a finishing process, a transport process, etc. on the wafer W by operating the polishing unit, the finishing unit, and the transport processing unit. At that time, the substrate processing device 2 controls the operations of the polishing unit, the finishing unit, and the transport processing unit while referring to device setting information 10 formed by multiple device parameters respectively set to the polishing unit, the finishing unit, and the transport processing unit and recipe information 11 which determines the processing content of the polishing process and the finishing process.

The information processing device 3 is a terminal device used by a user, and is configured as a stationary or portable device. The information processing device 3 receives various input operations via a display screen such as an application program or a web browser, and displays various information via the display screen.

The information processing device 3 is a device that supports simulation during automatic operation of the substrate processing device 2 and formulation of a production plan by generating a substrate processing schedule 13 for sequentially performing the respective processes on a predetermined number of wafers W in the substrate processing device 2, and by calculating an evaluation index 14 of the substrate processing schedule 13 based on the device setting information 10, the recipe information 11, transport time information 12 indicating transport time required for a transport process, etc. Note that the information processing device 3 may be configured as a server-type or cloud-type device, in that case, the information processing device 3 may be configured to operate in cooperation with a user terminal device (not shown) on a client side.

(Substrate Processing Device)

Figure 2:
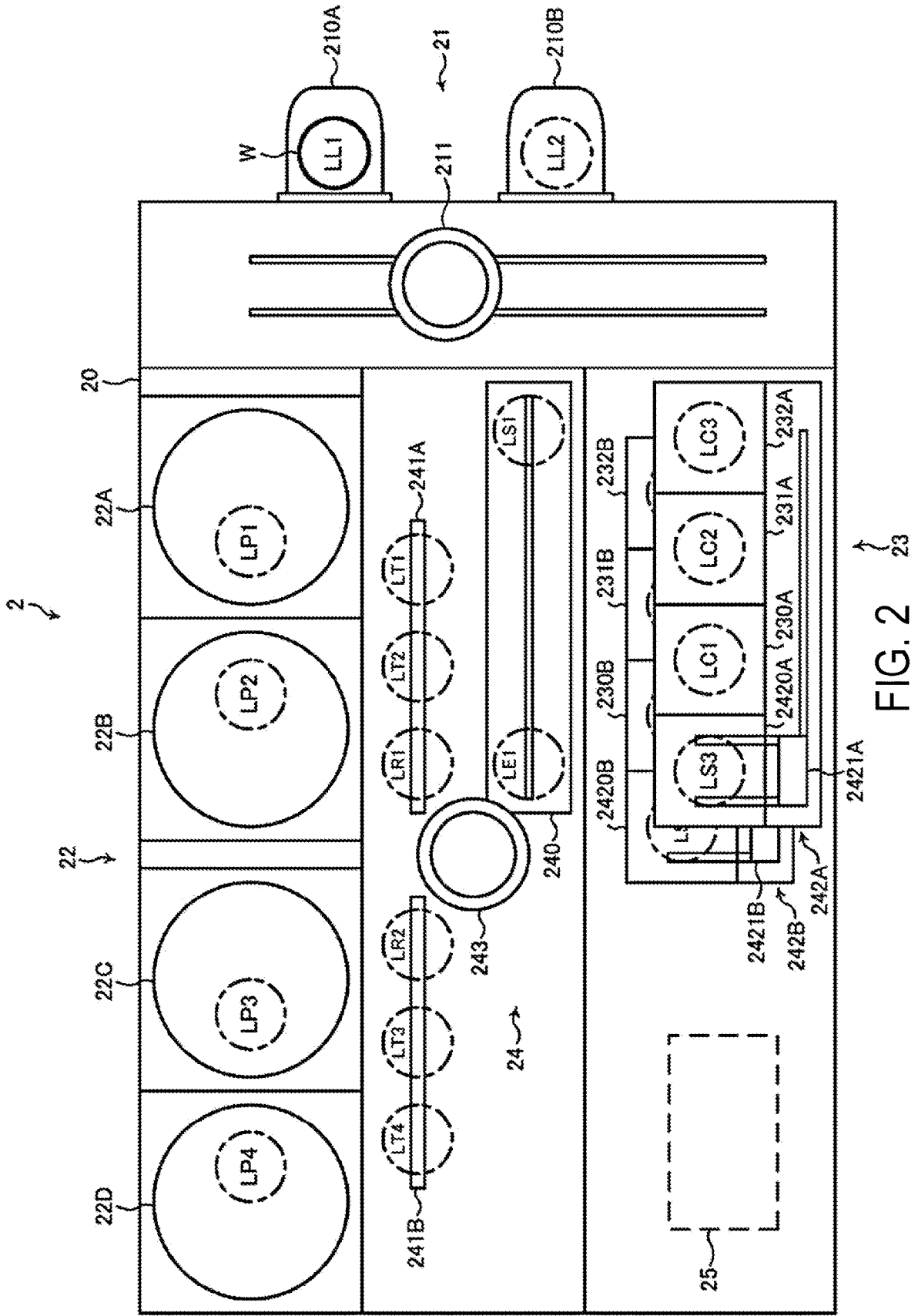
FIG. 2 is a schematic plan view showing an example of a substrate processing device 2.
Figure 3:
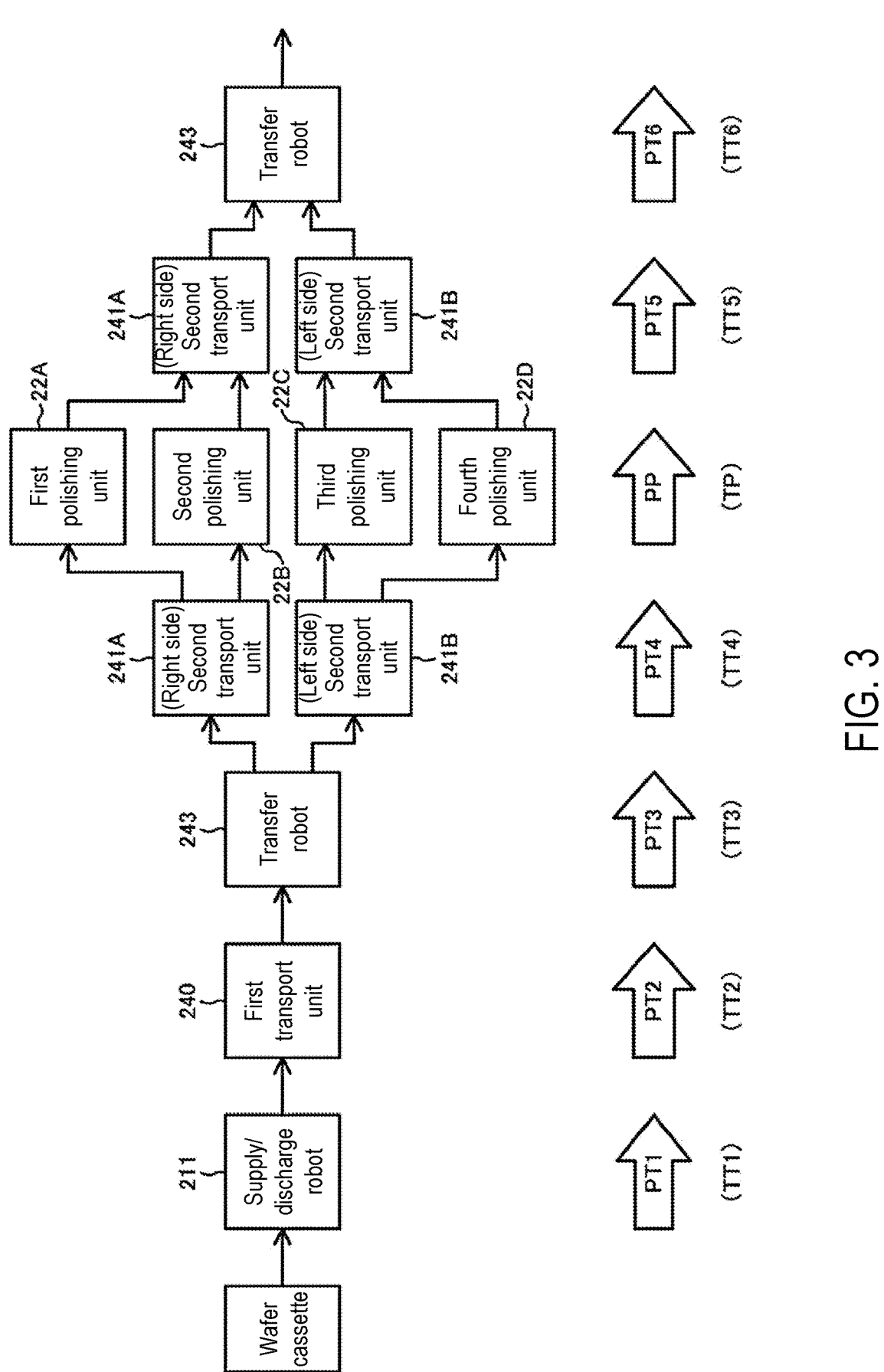
FIG. 3 is a schematic diagram showing an example of a transport route (first half) of a wafer W in the substrate processing device 2.
Figure 4:
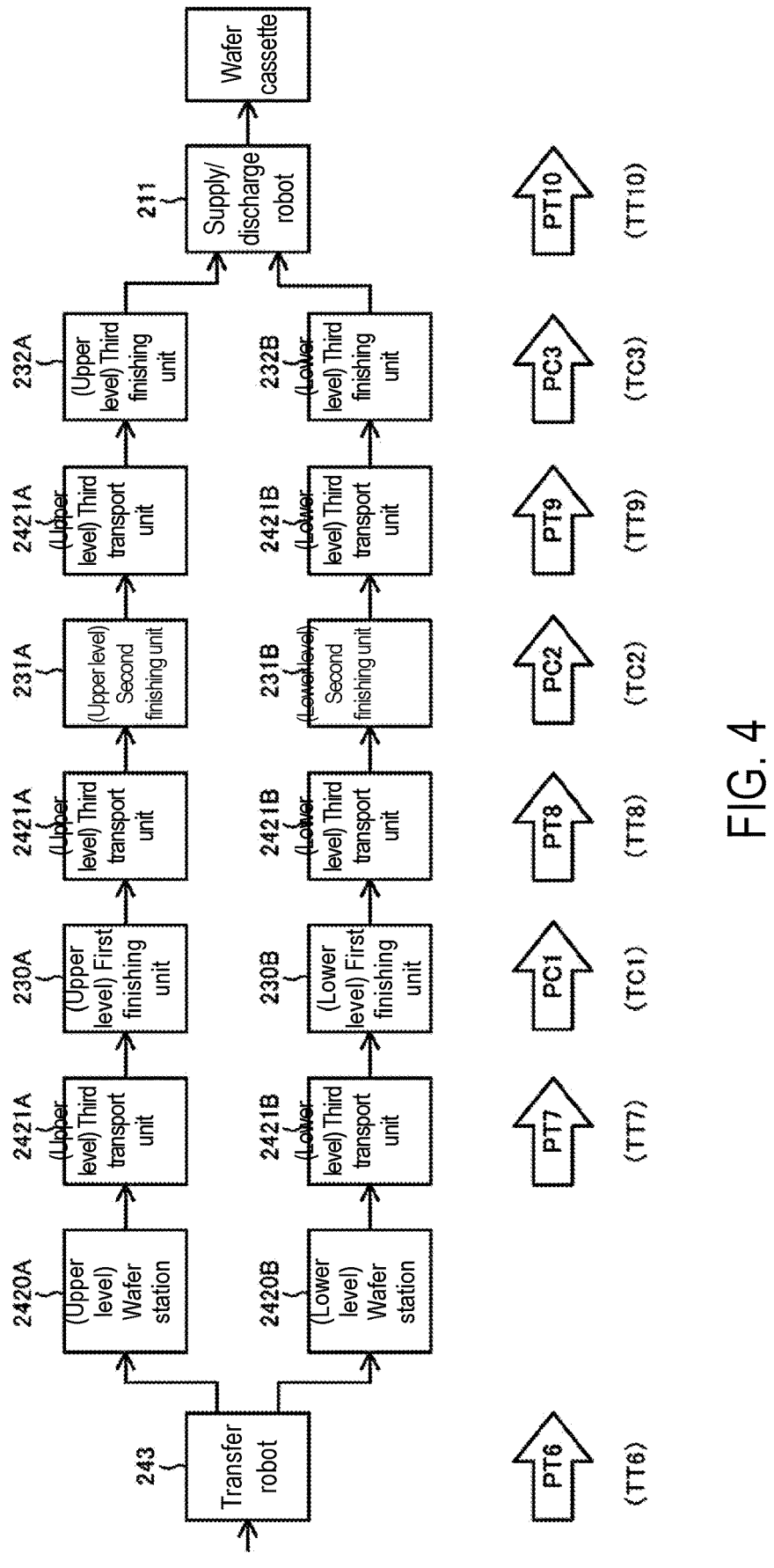
FIG. 4 is a schematic diagram showing an example of a transport route (second half) of the wafer W in the substrate processing device 2.

FIG. 2 is a schematic plan view showing an example of a substrate processing device 2. FIGS. 3 and 4 are schematic diagrams showing an example of a transport route for the wafer W in the substrate processing device 2. The substrate processing device 2 is configured to include a load/unload part 21, a polishing part 22, a finishing part 23, a substrate transport part 24, and a control unit 25 inside a housing 20 which is substantially rectangular in plan view.

(Load/Unload Part)

The load/unload part 21 includes first and second front load parts 210A and 210B in which wafer cassettes (substrate cassettes such as FOUPs) capable of storing a large number of wafers W in an up-down direction are placed at wafer cassette positions LL1 and LL2, and a supply/discharge robot 211 which supplies and discharges the wafers W.

The supply/discharge robot 211 is configured to be movable in a horizontal direction along a lateral direction of the housing 20, and is configured to be movable in the up-down direction and a turning direction. The supply/discharge robot 211 is equipped with two hands in the upper and lower levels (not shown) for transferring the wafer W. One hand is used to deliver the wafer W before the polishing process, and the other hand is used to deliver the wafer W after the finishing process. The hands are configured to be extendable and retractable, and to be capable of turning the wafer W upside down, for example.

As a transport process PT of the wafer W, the supply/discharge robot 211 performs a substrate supply process PT1 that takes out the wafer W before the polishing process from the wafer cassette and supplies the wafer W before the polishing process to the first transfer unit 240 and a substrate discharge process PT10 that receives the wafer W after the finishing process from the finishing part 23 (in the embodiment, third finishing units 232A and 232B) and stores the wafer W after the finishing process in the wafer cassette.

(Polishing Part)

The polishing part 22 includes multiple (four in the embodiment) polishing units 22A to 22D, and each of which performs a polishing process PP of the wafer W. In the embodiment, first to fourth polishing units 22A to 22D are disposed side by side along a longitudinal direction of the housing 20, and perform the polishing process PP of the wafer W in parallel at polishing positions LP1 to LP4. The first to fourth polishing units 22A to 22D are configured to be accessible to polishing unit delivery positions LT1 to LT4 for delivering the wafers W. The polishing unit delivery positions LT1 to LT4 are individually set for the first to fourth polishing units 22A to 22D.

Figure 5:
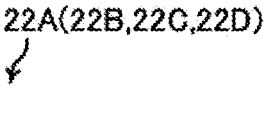
FIG. 5 is a perspective view showing an example of first to fourth polishing units 22A to 22D.

FIG. 5 is a perspective view showing an example of the first to fourth polishing units 22A to 22D. In the embodiment, the first to fourth polishing units 22A to 22D are described as components sharing basic configuration and functions.

Each of the first to fourth polishing units 22A to 22D includes a polishing table 220 which rotatably supports a polishing pad 2200 having a polishing surface; a top ring (substrate holding part) 221 which rotatably holds the wafer W and polishes the wafer W while pressing the wafer W against the polishing pad 2200 on the polishing table 220; a polishing fluid supply part 222 which supplies polishing fluid to the polishing pad 2200; a dresser 223 which rotatably supports a dresser disk 2230 and dresses the polishing pad 2200 by bringing the dresser disk 2230 into contact with the polishing surface of the polishing pad 2200; and an atomizer 224 which injects cleaning fluid onto the polishing pad 2200.

The polishing table 220 includes a rotary movement mechanism part 220b which is supported by a polishing table shaft 220a and rotatably drives the polishing table 220 around an axis center thereof and a temperature regulation mechanism part 220c which regulates the surface temperature of the polishing pad 2200.

The top ring 221 includes a rotary movement mechanism part 221c which is supported by a top ring shaft 221a movable in the up-down direction, and rotatably drives the top ring 221 around the axis center thereof; an up-down movement mechanism part 221d which moves the top ring 221 in the up-down direction; and a swing movement mechanism part 221e which turnably (swingably) moves the top ring 221 with the support shaft 221b as a turning center. The rotary movement mechanism part 221c, the up-down movement mechanism part 221d, and the swing movement mechanism part 221e function as a substrate movement mechanism part which moves relative positions of the polishing pad 2200 and the polished surface of the wafer W.

The polishing fluid supply part 222 includes a polishing fluid supply nozzle 222a which supplies the polishing fluid to the polishing surface of the polishing pad 2200; a swing movement mechanism part 222c which is supported by a support shaft 222b and turnably moves the polishing fluid supply nozzle 222a with the support shaft 222b as the turning center; a flow rate regulation part 222d which regulates the flow rate of the polishing fluid; and a temperature regulation mechanism part 222e which regulates the temperature of the polishing fluid. The polishing fluid is a polishing liquid (slurry) or pure water, and may also include a chemical solution, and a dispersant may be added to the polishing liquid.

The dresser 223 includes a rotary movement mechanism part 223c which is supported by a dresser shaft 223a movable in the up-down direction and rotatably drives the dresser 223 around the axis center thereof; an up-down movement mechanism part 223d which moves the dresser 223 in the up-down direction; and a swing movement mechanism part 223e which turnably moves the dresser 223 with the support shaft 223b as the turning center.

The atomizer 224 includes a swing movement mechanism part 224b which is supported by a support shaft 224a and turnably moves the atomizer 224 with the support shaft 224a as the turning center; and a flow rate regulation part 224c which regulates the flow rate of the cleaning fluid. The cleaning fluid is mixed fluid of a liquid (e.g., pure water) and a gas (e.g., nitrogen gas) or a liquid (e.g., pure water).

In the polishing process PP, the top ring 221 moves to the polishing unit delivery positions LT1 to LT4, and holds by suctioning the wafer W before the polishing process on the lower surface of the top ring 221, thereby receiving the wafer W before the polishing process from the second transport units 241A and 241B. Next, the top ring 221 moves to the polishing positions LP1 to LP4 on the polishing table 220, and presses the wafer W against the polishing surface of the polishing pad 2200 to which the polishing fluid is supplied from the polishing fluid supply nozzle 222*a*, thereby polishing the wafer W. Then, when the polishing process PP is finished, the top ring 221 moves to the polishing unit delivery positions LT1 to LT4, and delivers the wafer W after the polishing process to the second transport units 241A and 241B.

(Finishing Part)

The finishing part 23 includes multiple finishing units 230A to 232A and 230B to 232B (in the embodiment, a total of six, three types each disposed in two levels upper and lower) that respectively perform a finishing process PC on the wafers W. In the embodiment, first to third finishing units 230A to 232A are disposed side by side in the upper level along the longitudinal direction of the housing 20, and first to third finishing units 230B to 232B having the same configuration are disposed side by side in the lower level along the longitudinal direction of the housing 20. The first to third finishing units 230A to 232A and 230B to 232B perform the finishing process PC in the order of the arrangement (order of the finishing process) at the finishing positions LC1 to LC3, respectively.

As the finishing process PC in the most upstream process, the first finishing units 230A and 230B perform a roll sponge cleaning process (first finishing process PC1) using a roll sponge 2300 to clean the wafer W after the polishing process. The second finishing units 231A and 231B perform a pen sponge cleaning process (second finishing process PC2) using a pen sponge 2310 to clean the wafer W after the roll sponge cleaning process. As the finishing process PC in the most downstream process, the third finishing units 232A and 232B perform a drying process (third finishing process PC3) to dry the wafer W after the pen sponge cleaning process. Note that the finishing process PC may, for example, omit the roll sponge cleaning process and start with the pen sponge cleaning process.

Note that the finishing part 23 may include a finishing unit (not shown) which performs a buff cleaning process that washes the wafer W using a buff, in place of or in addition to any of the first and second finishing units 230A, 230B, 231A, and 231B, and any of the first and second finishing units 230A, 230B, 231A, and 231B may be omitted. Furthermore, in the embodiment, it is described that the first to third finishing units 230A to 232A and 230B to 232B hold the wafer W in horizontal placement (hold horizontally), but the wafer W may also be held vertically or obliquely.

Figure 6:
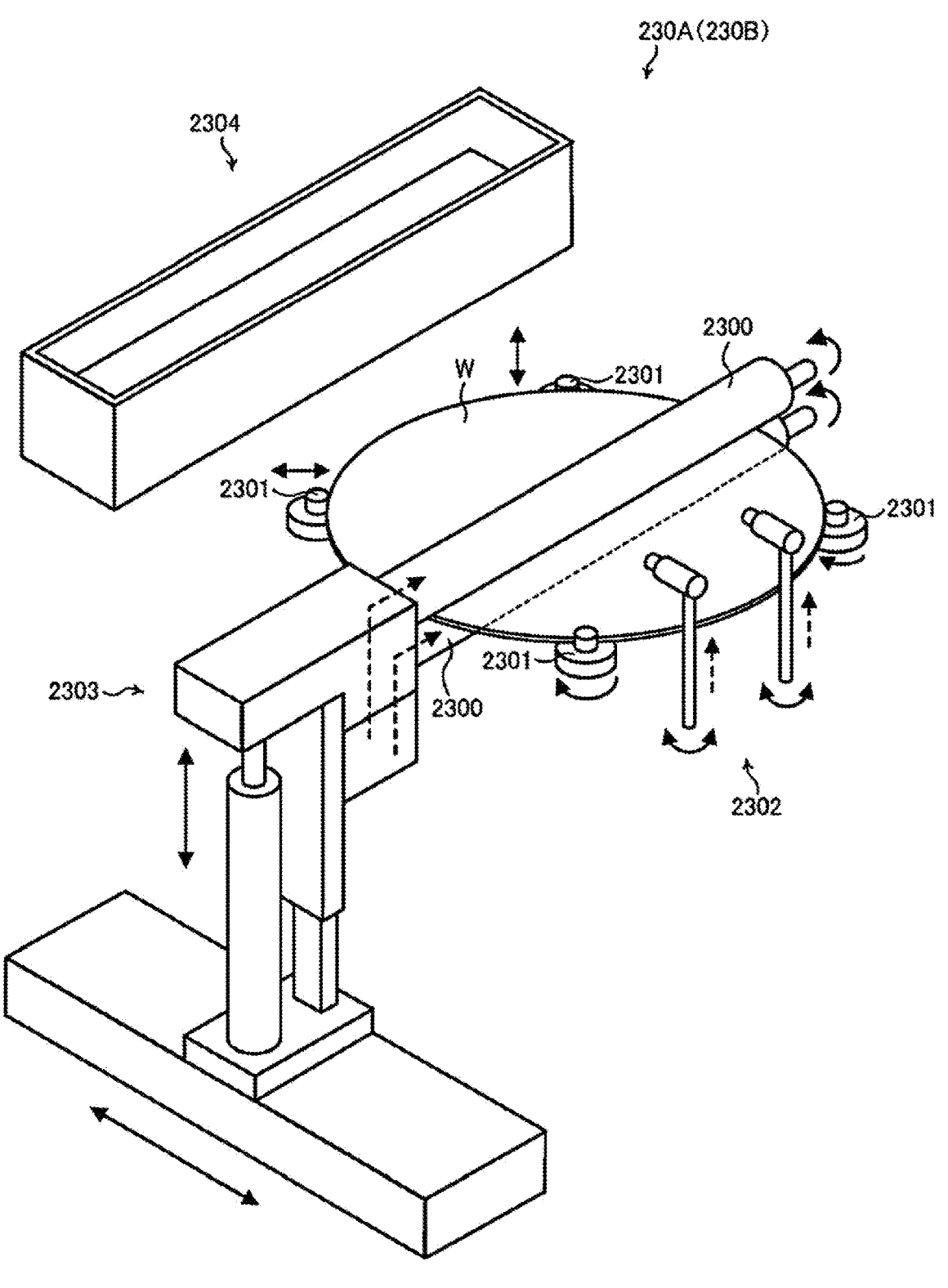
FIG. 6 is a perspective view showing an example of first finishing units 230A and 230B which perform a roll sponge cleaning process.

FIG. 6 is a perspective view showing an example of first finishing units 230A and 230B which perform a roll sponge cleaning process. The first finishing units 230A and 230B include a substrate holding part 2301 which holds the wafer W; a cleaning fluid supply part 2302 which supplies substrate cleaning fluid to the wafer W; a substrate cleaning part 2303 which rotatably supports the roll sponge 2300 and cleans the wafer W by bringing the roll sponge 2300 into contact with the wafer W; and a cleaning tool cleaning part 2304 which cleans (self-cleans) the roll sponge 2300 using cleaning tool cleaning fluid. The substrate cleaning fluid may be any of pure water (rinse liquid) and a chemical solution, may be a liquid, may be two-fluid in which a liquid and a gas are mixed, and may also include a solid such as dry ice. The cleaning tool cleaning fluid may be any of pure water (rinse liquid) and a chemical solution.

In the roll sponge cleaning process by using the first finishing units 230A and 230B, the wafer W is rotated in the state of being held at the first finishing position LC1 by the substrate holding part 2301. Then, in the state in which the substrate cleaning fluid is supplied to a cleaned surface of the wafer W from the cleaning fluid supply part 2302, the wafer W is cleaned by bringing the roll sponge 2300 rotated around the axis center by the substrate cleaning part 2303 into sliding contact with the cleaned surface of the wafer W.

Figure 7:
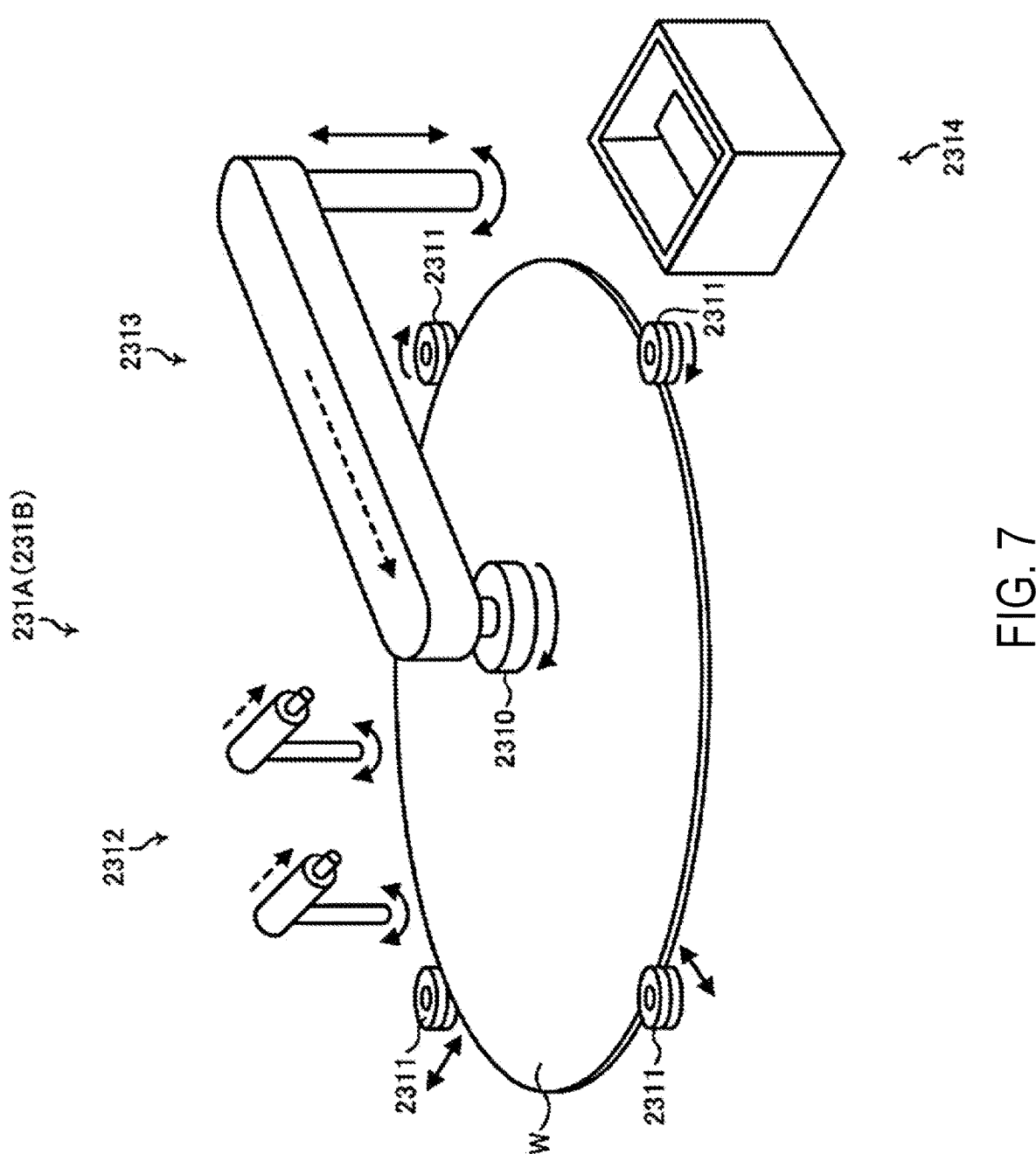
FIG. 7 is a perspective view showing an example of second finishing units 231A and 231B which perform a pen sponge cleaning process.

FIG. 7 is a perspective view showing an example of second finishing units 231A and 231B which perform a pen sponge cleaning process. The second finishing units 231A and 231B include a substrate holding part 2311 which holds the wafer W; a cleaning fluid supply part 2312 which supplies substrate cleaning fluid to the wafer W; a substrate cleaning part 2313 which rotatably supports the pen sponge 2310 and cleans the wafer W by bringing the pen sponge 2310 into contact with the wafer W; and a cleaning tool cleaning part 2314 which cleans (self-cleans) the pen sponge 2310 using the cleaning tool cleaning fluid.

In the pen sponge cleaning process by using the second finishing units 231A and 231B, the wafer W is rotated in the state of being held at the second finishing position LC2 by the substrate holding part 2311. Then, in the state in which the substrate cleaning fluid is supplied to the cleaned surface of the wafer W from the cleaning fluid supply part 2312, the wafer W is cleaned by bringing the pen sponge 2310 rotated around the axis center by the substrate cleaning part 2313 into sliding contact with the cleaned surface of the wafer W.

Figure 8:
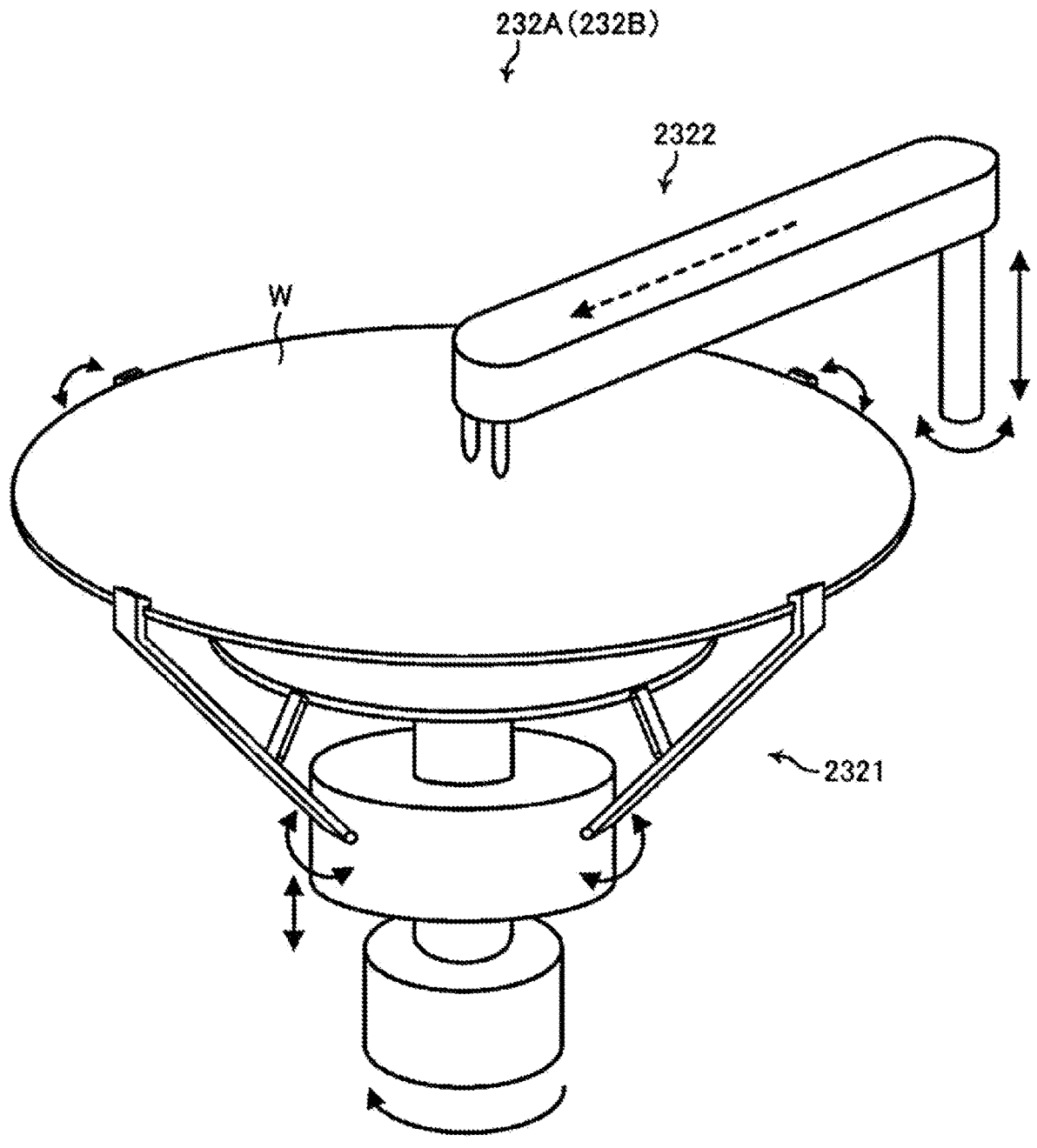
FIG. 8 is a perspective view showing an example of third finishing units 232A and 232B which perform a drying process.

FIG. 8 is a perspective view showing an example of third finishing units 232A and 232B which perform a drying process. The third finishing units 232A and 232B include a substrate holding part 2321 which holds the wafer W, and a drying fluid supply part 2322 which supplies substrate drying fluid to the wafer W. The substrate drying fluid may be, for example, IPA steam and pure water (rinse liquid), may be a liquid, may be two-fluid in which a liquid and a gas are mixed, and may also include a solid such as dry ice.

In the drying process by using the third finishing units 232A and 232B, the wafer W is rotated in the state of being held at the third finishing position LC3 by the substrate holding part 2321. Then, in the state in which the substrate drying fluid is supplied to the cleaned surface of the wafer W from the drying fluid supply part 2322, the drying fluid supply part 2322 is moved to the side of a lateral edge part (radially outer side) of the wafer W. Then, the wafer W is dried by being rotated at a high speed.

(Substrate Transport Part)

Figure 9:
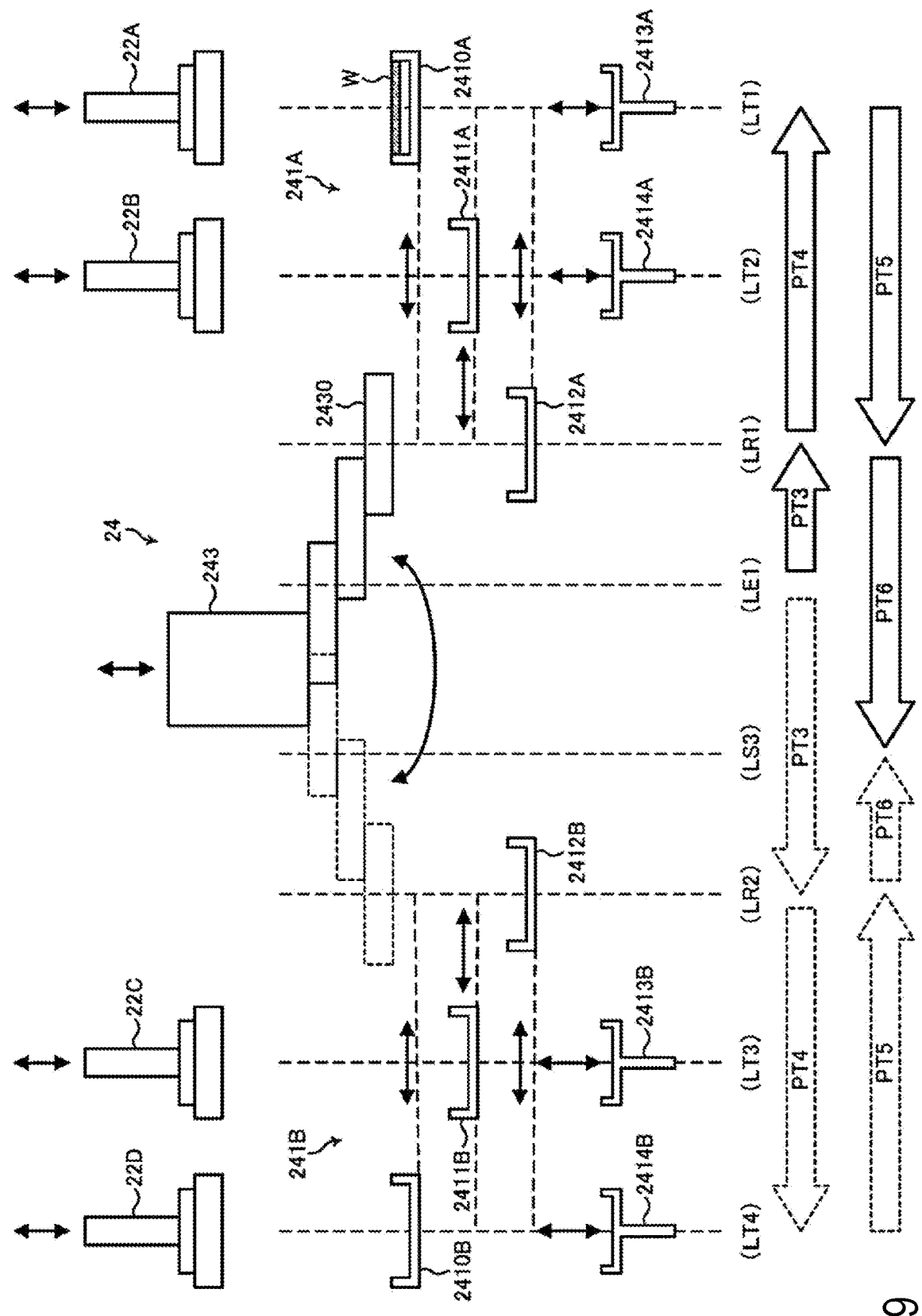
FIG. 9 is a schematic side view showing an example of a transport part 24 (second transport units 241A and 241B and a transfer robot 243).
Figure 10:
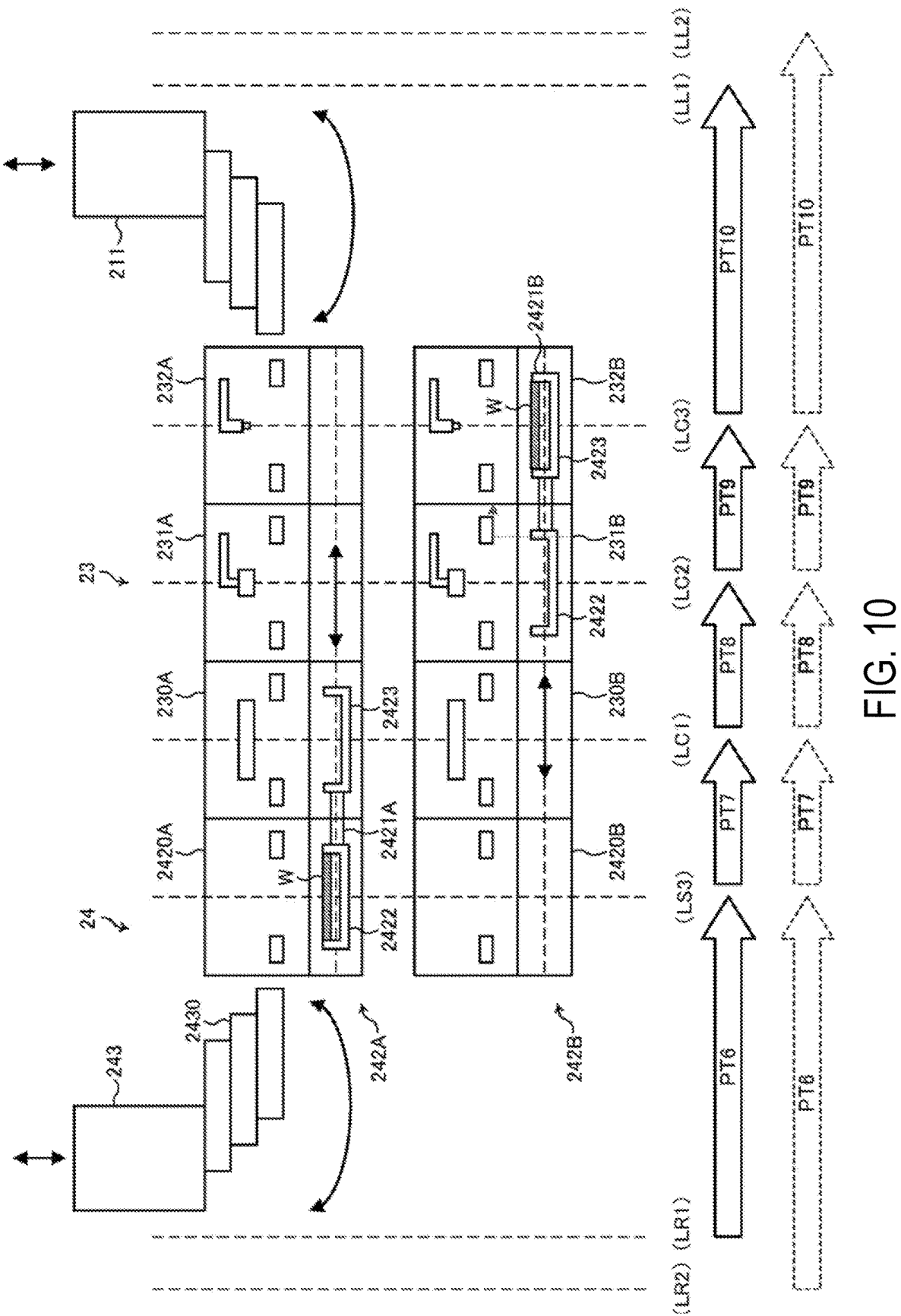
FIG. 10 is a schematic side view showing an example of the transport part 24 (third transport units 242A and 242B and the transfer robot 243).

FIG. 9 is a schematic side view showing an example of second transport units 241A and 241B and a transport robot 243. FIG. 10 is a schematic side view showing an example of the transport part 24 (third transport units 242A and 242B and the transfer robot 243).

As shown in FIG. 2, the substrate transport part 24 includes a first transport unit 240, the second transport units 241A and 241B, the third transport units 242A, 242B and the transfer robot 243. In the embodiment, as a second transport unit, the second transport unit 241A disposed on the side of the first and second polishing units 22A and 22B (hereinafter referred to as "right side") and the second transport unit 241B disposed on the side of the third and fourth polishing units 22C and 22D (hereinafter referred to as "left side") are provided. Further, as the third transport unit, the third transport unit 242A disposed in the upper level and the third transport unit 242B disposed in the lower level are provided.

The first transport unit 240 is disposed between the polishing part 22 and the finishing part 23, and is configured to be movable in the horizontal direction between a first transport start position LS1 and a first transport end position LE1 along the longitudinal direction of the housing 20.

As the transport process PT of the wafer W, the first transport unit 240 performs a pre-polishing transport process PT2 that transports the wafer W before the polishing process supplied by the supply/discharge robot 211 from the first transport start position LS1 to the first transport end position LE1.

The second transport units 241A and 241B are disposed on the side of the polishing part 22 and are configured to be movable in the horizontal direction along the longitudinal direction of the housing 20 and movable in the up-down direction.

The second transport unit 241A on the right side includes multiple (in the embodiment, a total of three disposed in three levels upper to lower) transport mechanisms 2410A to 2412A which move in the horizontal direction independently of each other between a transfer robot delivery position LR1 and the polishing unit delivery positions LT1 and LT2; a first pusher mechanism 2413A which is disposed at the polishing unit delivery position LT1 and moves in the up-down direction; and a second pusher mechanism 2414A which is disposed at the polishing unit delivery position LT2 and moves in the up-down direction.

The second transport unit 241B on the left side includes multiple (in the embodiment, a total of three disposed in three levels upper to lower) transport mechanisms 2410B to 2412B which move in the horizontal direction independently of each other between a transfer robot delivery position LR2 and the polishing unit delivery positions LT3 and LT4; a first pusher mechanism 2413B which is disposed at the polishing unit delivery position LT3 and moves in the up-down direction; and a second pusher mechanism 2414B which is disposed at the polishing unit delivery position LT4 and moves in the up-down direction.

As the transport process PT of the wafer W, each of the transport mechanisms 2410A to 2412A and 2410B to 2412B in the second transport units 241A and 241B performs a pre-polishing process loading process PT4 that transports the wafer W before the polishing process from the transfer robot delivery positions LR1 and LR2 to the polishing unit delivery positions LT1 to LT4 and a post-polishing unloading process PT5 that transports the wafer W after the polishing process from the polishing unit delivery positions LT1 to LT4 to the transfer robot delivery positions LR1 and LR2.

The third transport units 242A and 242B are disposed on the side of the finishing part 23 and is configured to be movable in the horizontal direction between a third transport start position LS3, the first finishing position LC1, the second finishing position LC2, and the third finishing position LC3 along the longitudinal direction of the housing 20.

The third transport unit 242A in the upper level includes a wafer station 2420A which holds the wafer W after the polishing process and allows the wafer W to be on standby and a transport mechanism 2421A which moves in the horizontal direction between the wafer station 2420A and the first to third finishing units 230A to 232A. The third transport unit 242B in the lower level includes a wafer station 2420B which holds the wafer W after the polishing process and allows the wafer W to be on standby and a transport mechanism 2421B which moves in the horizontal direction between the wafer station 2420B and the first to third finishing units 230B to 232B. The transport mechanisms 2421A and 2421B include a pair of left and right hands 2422 and 2423 for delivering the wafer W. One hand 2422 is used when delivering the wafer W after the polishing process but before the finishing process, the other hand 2423 is used when delivering the wafer W after the finishing process. The hands 2422 and 2423 are configured to be extendable and retractable, and to be capable of turning the wafer W upside down, for example.

As the transport process PT of the wafer W, the transport mechanisms 2421A and 2421B in the third transport units 242A and 242B perform a post-polishing transport process PT7 that transports the wafer W after the polishing process from the third transport start position LS3 to the finishing part 23 (in the embodiment, the first finishing position LC1 of the first finishing units 230A and 230B) and in-finishing transport processes PT8 and PT9 that transport the wafer W in the finishing process between the respective finishing units. In the embodiment, as the in-finishing transport process, the third transport units 242A and 242B perform a first in-finishing transport process PT8 that transports the wafer W in the finishing process from the first finishing units 230A and 230B (the first finishing position LC1) to the second finishing units 231A and 231B (the second finishing position LC2) and a second in-finishing transport process PT9 that transports the wafer W in the finishing process from the second finishing units 231A and 231B (the second finishing position LC2) to the third finishing units 232A and 232B (the third finishing position LC3).

The transfer robot 243 is configured to be movable in the up-down direction and movable in the turning direction. The transfer robot 243 includes a hand 2430 for delivering the wafer W. The hand 2430 is configured to be extendable and retractable, and to be capable of turning the wafer W upside down, for example.

As the transport process PT of the wafer W, the transfer robot 243 performs a pre-polishing transfer process PT3 that receives the wafer W before the polishing process from the first transport unit 240 at the first transport end position LE1 and delivers the wafer W before the polishing process to the second transport units 241A and 241B at the transfer robot delivery positions LR1 and LR2 and a post-polishing transfer process PT6 that receives the wafer W after the polishing process from the second transport units 241A and 241B at the transport robot delivery positions LR1 and LR2 and delivers the wafer W after the polishing process to the third transport units 242A and 242B at the third transport start position LS3.

(Controller Unit)

Figure 11:
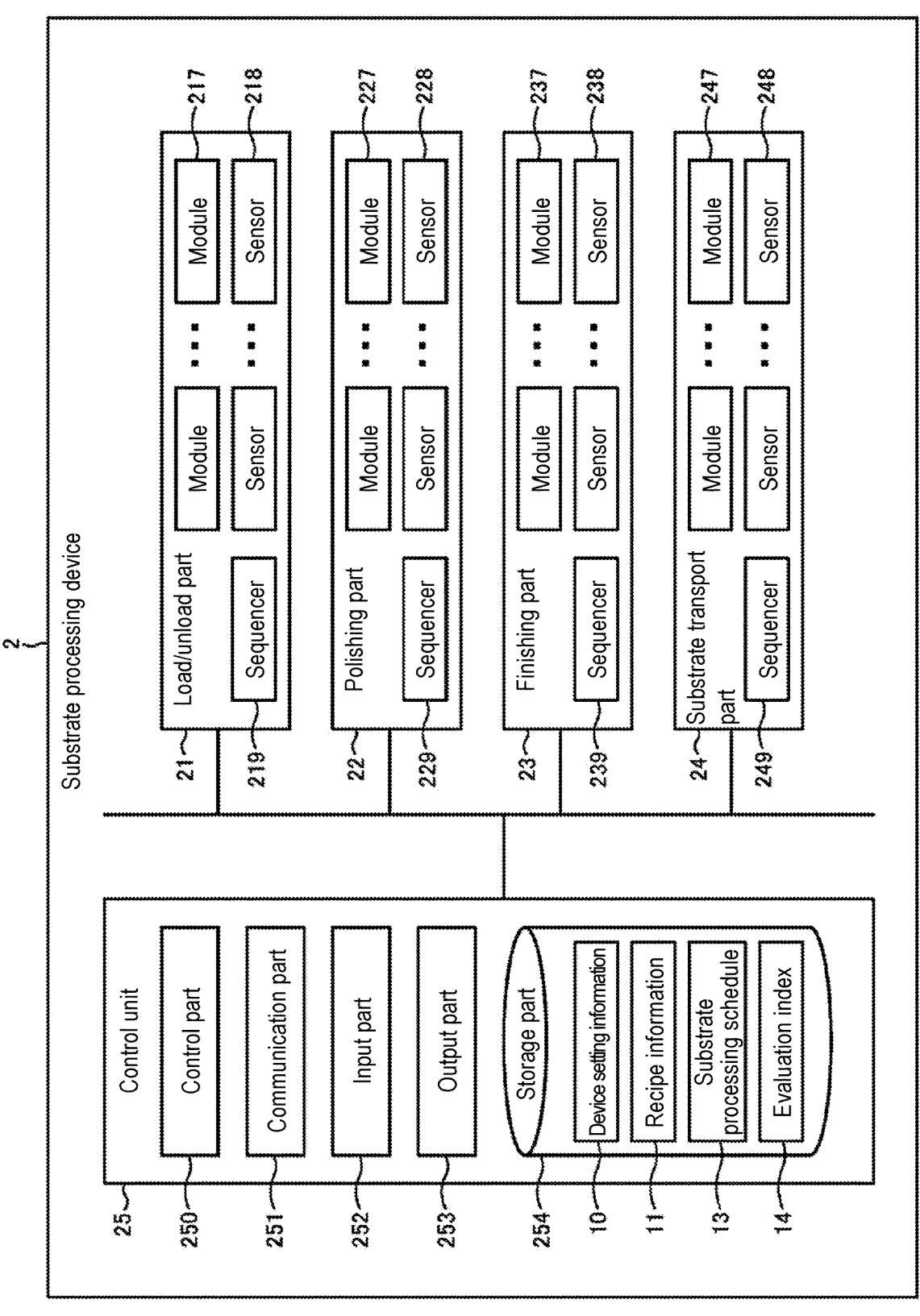
FIG. 11 is a block diagram showing an example of the substrate processing device 2.

FIG. 11 is a block diagram showing an example of the substrate processing device 2. The control unit 25 is electrically connected to each of the parts 21 to 24 and functions as a control part that controls each of the parts 21 to 24 in an integrated manner. Below, the control system (modules, sensors, and sequencers) of the substrate transport part 24 will be described as an example, the load/unload part 21, the polishing part 22, and the finishing part 23 also share the same basic configuration and functions, so the description thereof will be omitted.

The substrate transport part 24 includes multiple modules 247 which are respectively disposed in the respective parts included in the substrate transport part 24 and serve as control targets; multiple sensors 248 which are respectively disposed in the modules 247 and detect data (detection values) required for controlling the respective modules 247; and a sequencer 249 which controls the operations of the respective modules 247 based on the detection values of the respective sensors 248. The module 247 of the substrate transport part 24 includes a rotary motor, a linear motor, an air actuator, a hydraulic actuator, etc. provided in each of the parts. Further, the sensor 248 of the substrate transport part 24 includes, for example, an encoder sensor, a linear sensor, a limit sensor, a contactless sensor which detects the presence or absence of the wafer W, and the like.

The control unit 25 includes a control part 250, a communication part 251, an input part 252, an output part 253, and a storage part 254. The control unit 25 is formed by, for example, a general-purpose or dedicated computer (see FIG. 12 to be described afterwards).

The communication part 251 is connected to the network 4 and functions as a communication interface for transmitting and receiving various data. The input part 252 receives various input operations, and the output part 253 functions as a user interface by outputting various information via a display screen, a signal tower lighting, and a buzzer sound.

The storage part 254 stores various programs (operating systems (OS), application programs, web browsers, etc.) and data (the device setting information 10, the recipe information 11, etc.) used in the operation of the substrate processing device 2. The device setting information 10 and the recipe information 11 are data editable by the user via the display screen.

The control part 250 acquires detection values of multiple sensors 218, 228, 238, and 248 (hereinafter referred to as a "sensor group") via multiple sequencers 219, 229, 239, and 249 (hereinafter referred to as a "sequencer group"), and operates the modules 217, 227, 237, and 247 (hereinafter referred to as a "module group") in cooperation. Then, the substrate processing device 2 controls the respective parts 21 to 24 by using the control part 250, and executes automatic operation by sequentially performing the polishing process PP, the finishing process PC, the transport process PT, etc. on the wafers W in the wafer cassette.

(Hardware Configuration of Each of Devices)

Figure 12:
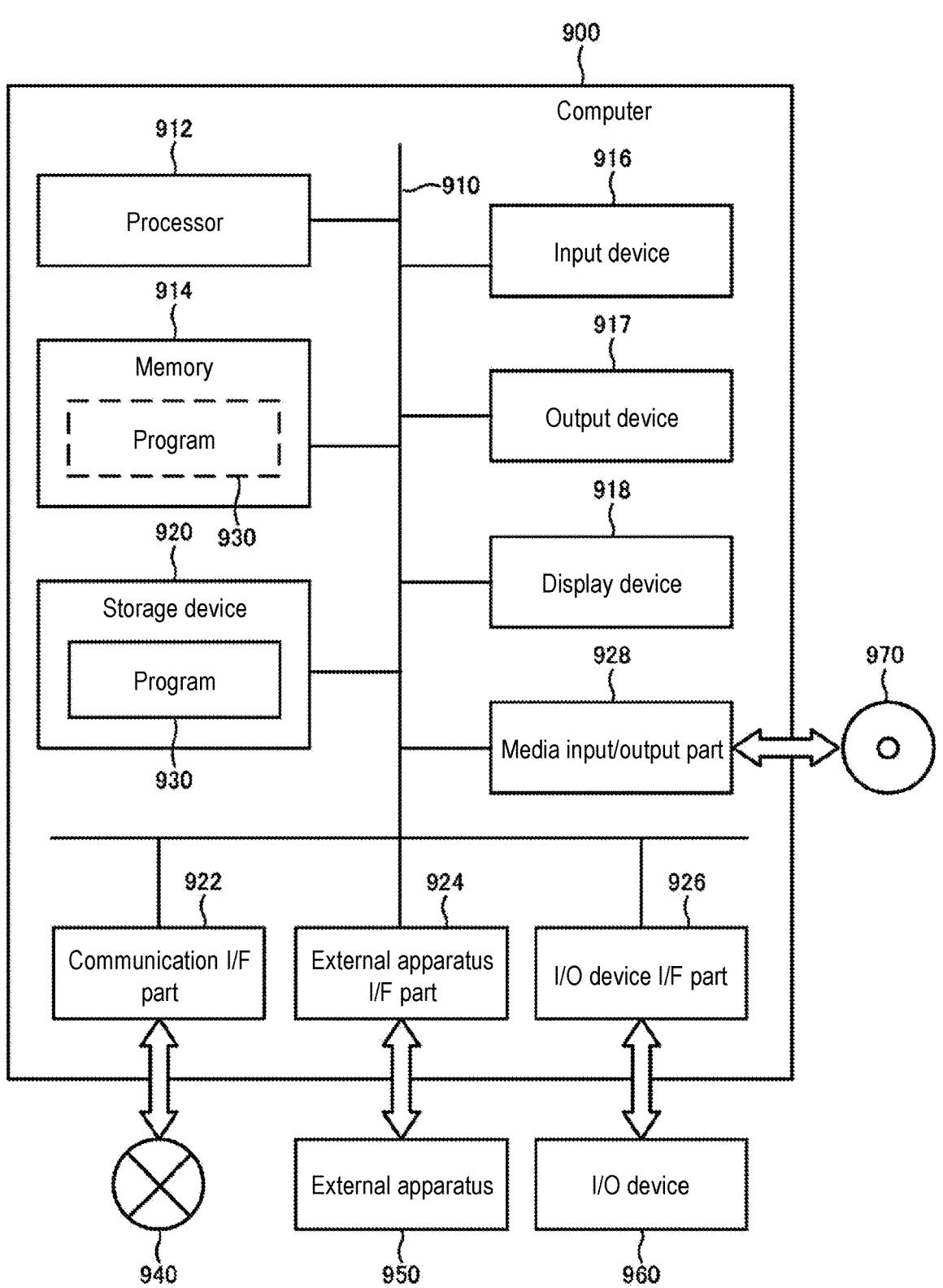
FIG. 12 is a view showing a hardware configuration of an example of a computer 900.

FIG. 12 is a view showing a hardware configuration of an example of a computer 900. Each of the control unit 25 of the substrate processing device 2 and the information processing device 3 is formed by a general-purpose or dedicated computer 900.

As shown in FIG. 12, the computer 900 mainly includes a bus 910, a processor 912, a memory 914, an input device 916, an output device 917, a display device 918, a storage device 920, a communication interface (I/F) part 922, an external apparatus I/F part 924, an input/output (I/O) device I/F part 926, and a media input/output part 928. Note that the above-mentioned components may be omitted as appropriate depending on the purpose of use of the computer 900.

The processor 912 is formed by one or more computational processing units (a central processing unit (CPU), a micro-processing unit (MPU), a digital signal processor (DSP), a graphics processing unit (GPU), etc.), and operates as a control part that controls the entire computer 900. The memory 914 stores various data and programs 930, and is formed by, for example, a volatile memory (DRAM, SRAM, etc.), a non-volatile memory (ROM), a flash memory, etc., that functions as a main memory.

The input device 916 is formed by, for example, a keyboard, a mouse, a numeric key pad, an electronic pen, etc., and functions as an input part. The output device 917 is formed by, for example, a sound (voice) output device, a vibration device, etc., and functions as an output part. The display device 918 is formed by, for example, a liquid crystal display, an organic EL display, an electronic paper, a projector, etc., and functions as the output part. The input device 916 and the display device 918 may also be formed integrally, such as a touch panel display. The storage device 920 is formed by, for example, an HDD, a solid state drive (SSD), etc., and functions as the storage part. The storage device 920 stores various data required for execution of the operating system and the programs 930.

The communication I/F part 922 is connected to the network 940 (may be the same as the network 4 of FIG. 1) such as the Internet or an intranet by wire or wirelessly, and functions as a communication part which performs data transmission/reception with another computer according to a predetermined communication standard. The external apparatus I/F part 924 is connected to an external apparatus 950 such as a camera, a printer, a scanner, a reader/writer, etc. by wire or wirelessly, and functions as a communication part which performs data transmission/reception with the external apparatus 950 according to a predetermined communication standard. The I/O device I/F part 926 is connected to the I/O device 960 such as various sensors and actuators, and functions as a communication part which transmits and receives various signals and data, such as a detection signal from a sensor and a control signal to an actuator, to and from the I/O device 960. The media input/output part 928 is formed by, for example, a drive device such as a DVD drive, a CD drive, etc., and reads/writes data from/to a medium (non-temporary storage medium) 970 such as a DVD or CD.

In the computer 900 having the above configuration, the processor 912 calls the program 930 stored in the storage device 920 to the memory 914 and executes the program 930, and controls the respective parts of the computer 900 via the bus 910. Note that the program 930 may be stored in the memory 914 in place of the storage device 920. The program 930 may be recorded on the medium 970 in an installable file format or an executable file format, and may be provided to the computer 900 via the media input/output part 928. The program 930 may be provided to the computer 900 by being downloaded via the network 940 via the communication I/F part 922. In addition, the computer 900 may implement various functions that are realized by executing the program 930 by the processor 912 using hardware such as a field-programmable gate array (FPGA) or an application specific integrated circuit (ASIC).

The computer 900 may be formed by, for example, a desktop computer or a portable computer, and may be an electronic apparatus of any form. The computer 900 may be a client type computer, may be a server type computer, or a cloud type computer, such as a so-called embedded computer like a control panel, a controller (including a micro-controller, a programmable logic controller, and a sequencer), or the like. The computer 900 may also be applied to devices other than the substrate processing device 2 and the information processing device 3.

(Information Processing Device)

Figure 13:
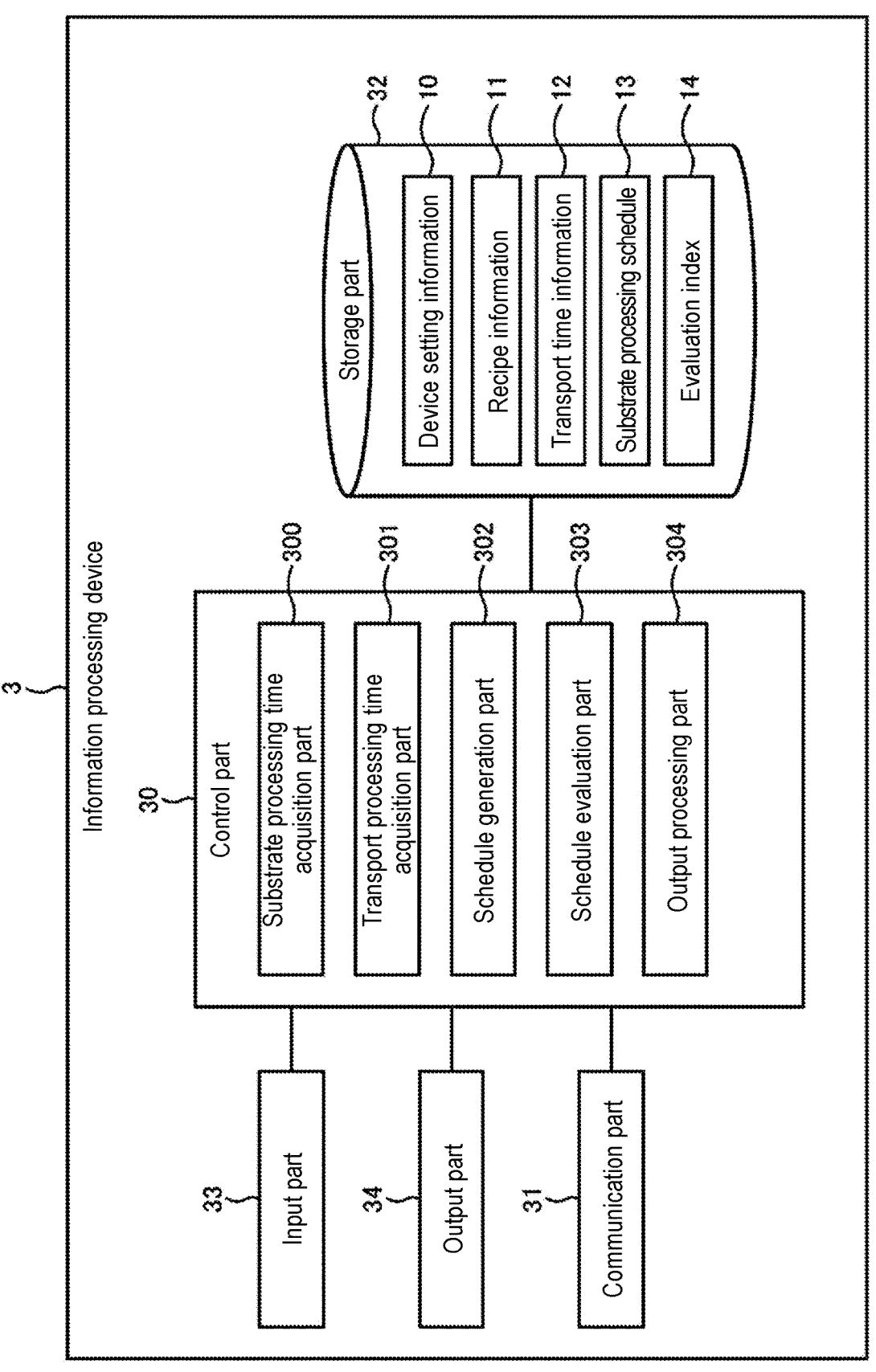
FIG. 13 is a block diagram showing an example of an information processing device 3.
Figure 14:
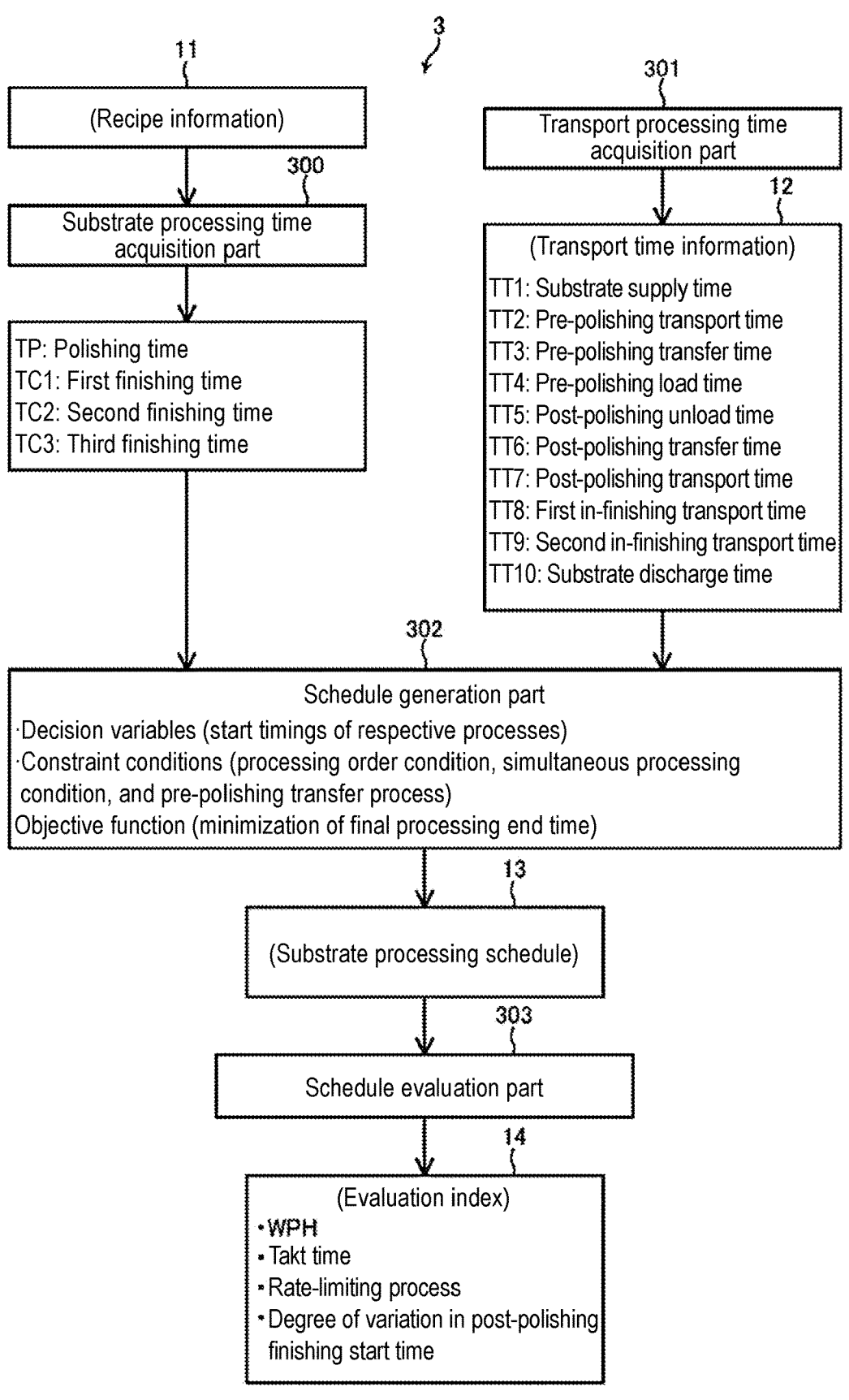
FIG. 14 is a functional descriptive diagram showing an example of the information processing device 3.

FIG. 13 is a block diagram showing an example of the information processing device 3 according to the embodiment. FIG. 14 is a functional descriptive diagram showing an example of the information processing device 3 according to the embodiment.

The information processing device 3 includes a control part 30, a communication part 31, a storage part 32, an input part 33, and an output part 34. The specific hardware configuration of each of the parts 30 to 34 shown in FIG. 13 is configured by the general-purpose or dedicated computer 900 shown in FIG. 12, so detailed description thereof will be omitted.

The control part 30 functions as a substrate processing time acquisition part 300, a transport processing time acquisition part 301, a schedule generation part 302, a schedule evaluation part 303, and an output processing part 304. The communication part 31 is connected to an external device (for example, the substrate processing device 2) via the network 4, and functions as a communication interface for transmitting and receiving various data. The storage part 32 stores various programs (operating systems, information processing programs, etc.) and data (the device setting information 10, the recipe information 11, the transport time information 12, the substrate processing schedule 13, the evaluation index 14), etc., used in the operation of the information processing device 3 The input part 33 receives various input operations, and the output part 34 outputs various information via a display screen or a sound, thereby functioning as a user interface.

The device setting information 10 is information which determines the operation content of the substrate processing device 2. The device setting information 10 has multiple device setting items, and determines the operation content of the substrate processing device 2 by setting setting values for each of the device setting items.

The device setting items include, for example, coordinate values, movement speed, movement acceleration, timer time, etc. of the respective transport units (in the embodiment, the supply/discharge robot 211, the first transport unit 240, the second transport units 241A and 241B, the third transport units 242A and 242B, and the transfer robot 243). In addition, the device setting items may include coordinate values, movement speed, movement acceleration, timer time, etc. of the polishing units 22A to 22D and the finishing units 230A to 232A and 230B to 232B.

The recipe information 11 is information which indicates the processing content of the polishing process PP and the finishing process PC. The recipe information 11 has multiple recipe setting items, and setting values are set for the respective recipe setting items, thereby determining the processing content of the polishing process PP and the finishing process PC. Note that the recipe information 11 may be set for each of the wafers W, or may be set for every multiple wafers that form a lot.

The recipe setting items for the polishing process PP include, for example, the table rotation speed by using the polishing table 220, the top ring pressing time by using the top ring 221, the wafer pressing load, the wafer rotation speed, the supply amount of the polishing fluid by using the polishing fluid supply part 222, the supply timing, the dresser operation time by using the dresser 223, the atomizer operation time by using the atomizer 224, and the like.

The recipe setting items for the finishing process PC include, for example, the roll sponge operating time, the roll sponge rotation speed, the wafer rotation speed, the supply amount of substrate cleaning fluid, and the supply timing in the roll sponge cleaning process (the first finishing process PC1), the pen sponge operation time, the pen sponge rotation speed, the wafer rotation speed, the supply amount of the substrate cleaning fluid, the supply timing, and the wafer rotation speed in the pen sponge cleaning process (the second finishing process PC2), and the drying operation time, the wafer rotation speed, the supply amount of substrate drying fluid, the supply timing in the drying process (the third finishing process PC3).

The substrate processing time acquisition part 300 acquires polishing time TP required for the polishing process PP and finishing time TC required for the finishing process PC based on the recipe information 11. For example, the substrate processing time acquisition part 300 acquires the recipe information 11 by transmitting and receiving data to and from the substrate processing device 2 via the communication part 31 and by referring to the storage part 32. Note that the recipe information 11 may be based on a user's input operation, or may be acquired from an external production control device (not shown).

Then, the substrate processing time acquisition part 300 acquires the polishing time TP and the finishing time TC by integrating the time required for the polishing process PP and the finishing process PC, respectively based on the setting values set for each of the recipe setting items in the recipe information 11. For example, the substrate processing time acquisition part 300 acquires the polishing time TP required for the polishing process PP based on the setting values set for the recipe setting items of the polishing process PP. Further, the substrate processing time acquisition part 300 acquires the finishing time TC required for the finishing process PC based on the setting values set for the recipe setting items of the finishing process PC. In the embodiment, first finishing time TC1 required for the first finishing process PC1, second finishing time TC2 required for the second finishing process PC2, and third finishing time TC3 required for the third finishing process PC3 are acquired as the finishing time TC.

Note that the polishing time TP and the finishing time TC1 to TC3 may take into consideration, for example, actual measurement values obtained by measuring the time when the polishing units 22A to 22D and the finishing units 230A to 232A and 230B to 232B actually operate. At that time, for example, if the actual measurement values are stored in the substrate processing device 2 or an external production control device, the substrate processing time acquisition part 300 may acquire the actual measurement values from the substrate processing device 2 or the external production control device as the polishing time TP and the finishing time TC1 to TC3, or may correct the polishing time TP and the finishing time TC1 to TC3 calculated from the recipe information 11 based on the actual measurement values. Furthermore, the polishing time TP and the finishing time TC1 to TC3 may be acquired for each of the wafers W, or may be acquired for every multiple wafers that form a lot.

The transport processing time acquisition part 301 acquires transport time TT required for the transport process PT of the wafer W as the transport time information 12. In the embodiment, substrate supply time TT1, pre-polishing transport time TT2, pre-polishing transfer time TT3, pre-polishing load time TT4, post-polishing unload time TT5, post-polishing transfer time TT6, post-polishing transport time TT7, first in-finishing transport time TT8, second in-finishing transport time TT9, and substrate discharge time TT10 are acquired as transport time TT1 to TT10 required for the respective transport processes PT1 to PT10. Note that the transport time TT1 to TT10 may be acquired for each of the wafers W, or may be acquired for every multiple wafers that form a lot.

For example, the transport time TT1 to TT10 may be actual values obtained by measuring the time when the transport units (in the embodiment, the supply/discharge robot 211, the first transport unit 240, the second transport units 241A and 241B, the third transport units 242A and 242B, and the transfer robot 243) actually operate. For example, if the actual values of the transport time are stored in the substrate processing device 2 or an external production control device, the transport processing time acquisition part 301 acquires the transport time TT1 to TT10 from the substrate processing device 2 or the external production control device.

Furthermore, the transport time TT1 to TT10 may be theoretical values calculated from the specifications of the transport units. For example, if the device setting information 10 includes the movement speed, the movement acceleration, etc. of the transport units, the transport processing time acquisition part 301 acquires the device setting information 10 from the substrate processing device 2 or the storage part 32, and acquires the transport time TT1 to TT10 based on the device setting information 10.

Furthermore, the transport time TT1 to TT10 may be estimated values that take into account the errors (actual operation errors) between the theoretical values and the actually measurement values when the transport units actually operate. For example, the transport processing time acquisition part 301 calculates the actual operation errors using an estimation model such as machine learning, and acquires the transport time TT1 to TT10 based on the actual measurement values and the actual operation errors.

The schedule generation part 302 generates the substrate processing schedule 13 for sequentially performing the respective processes on a predetermined number of wafers W in the substrate processing device 2. Specifically, the schedule generation part 302 generates the substrate processing schedule 13 by determining the start timings of the respective processes so that the final processing end time is the shortest when the final wafer W after the finishing process is carried out to the wafer cassette based on the polishing time TP and the finishing time TC1 to TC3 acquired by the substrate processing time acquisition part 300 and the transport time TT1 to TT10 acquired by the transport processing time acquisition part 301. Note that in place of or in addition to the final processing end time being the shortest, the schedule generation part 302 may generate the substrate processing schedule 13 by determining the start timings of the respective processes so that the post-polishing finishing start time from the end timing of the polishing process to the start timing of the finishing process of the most upstream process is uniform and minimum.

In the embodiment, the schedule generation part 302 formulates the substrate processing schedule 13 as an optimization problem through mathematical optimization, and generates the substrate processing schedule 13 by searching for an optimal solution. For example, mixed integer programming (MIP) may be used as a method of the mathematical optimization, and other methods may also be used. Further, as a search method for the optimal solution, any search algorithm such as an exact solution method, an approximate solution method, or a heuristic solution method can be used.

Figure 15:
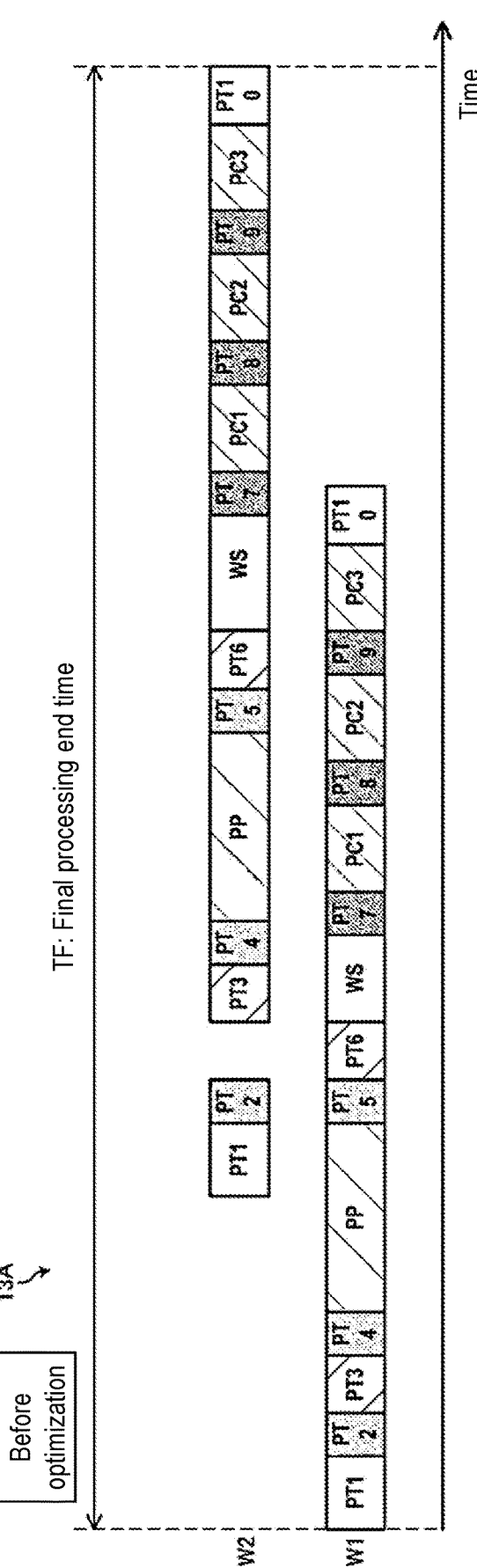
FIG. 15 is a diagram showing an example of a substrate processing schedule 13A before mathematical optimization.

FIG. 15 is a diagram showing an example of a substrate processing schedule 13A before mathematical optimization. The substrate processing schedule 13A shown in FIG. 15 is generated as a default before optimization (or in optimization) by the schedule generation part 302, for example. Although FIG. 15 shows the substrate processing schedule 13A for two wafers W for simplicity, the number of wafers W in the substrate processing schedule 13A may be modified as appropriate. In addition, before being optimized by the schedule generation part 302, the substrate processing schedule 13A may also be actual values recorded in chronological order of the respective processes when automatic operation is executed by the substrate processing device 2.

In automatic operation of the substrate processing device 2, the respective processes are performed in such a way that while maintaining the order in which the respective processes are performed, the processes capable of being performed simultaneously are performed in parallel, and the processes incapable of being performed simultaneously are performed in series. At this time, the pre-polishing transfer process PT3 and the post-polishing transfer process PT6 are performed by the transfer robot 243, and thus are incapable of being executed simultaneously. Therefore, if the situation in which the wafer W before the polishing process is transported to the first transport end position LE1 by the pre-polishing transport process PT2 of the first transport unit 240 and the situation in which the wafer W after the polishing process is transported to the transfer robot delivery positions LR1 and LR2 by the post-polishing unloading process PT5 of the second transport units 241A and 241B occur at the same time, the transfer robot 243 needs to prioritize and execute either the pre-polishing transfer process PT3 or the post-polishing transfer process PT6.

In the substrate processing schedule 13A shown in FIG. 15, in the above situation, priority is given to the post-polishing transfer process PT6 over the pre-polishing transfer process PT3. Therefore, the start of the pre-polishing transfer process PT3 was on standby until the post-polishing transfer process PT6 was completed, and there was a possibility that the transport of the wafers W to the polishing units 22A to 22D was delayed, and the evaluation index 14 of the substrate processing schedule 13A would deteriorate.

Therefore, the schedule generation part 302 generates the substrate processing schedule 13 by performing mathematical optimization in which a processing order condition which determines the order in which the respective processes are performed, a simultaneous processing condition which determines which processes are capable or incapable of being performed at the same time, and a transfer processing priority condition which specifies that the pre-polishing transfer process PT3 is prioritized over the post-polishing transfer process PT6 are set as constraint conditions for the mathematical optimization, the final processing end time TF which includes the polishing time TP and the finishing time TC1 to TC3 calculated by the substrate processing time acquisition part 300 and the transport time TT1 to TT10 indicated by the transport time information 12 as variables being the shortest is set as an objective function of the mathematical optimization, and the start timings of the respective processes are determined as decision variables of the mathematical optimization.

In the substrate processing device 2 according to the embodiment, the processing order condition is determined in the order of the substrate supply process PT1, the pre-polishing transport process PT2, the pre-polishing transfer process PT3, the pre-polishing loading process PT4, the polishing process PP, the post-polishing unloading process PT5, the post-polishing transfer process PT6, the post-polishing transport process PT7, the first finishing process PC1, the first in-finishing transport process PT8, the second finishing process PC2, the second in-finishing transport process PT9, the third finishing process PC3, and the substrate discharge process PT10.

Further, as the simultaneous processing condition, the polishing processes PP performed by the first to fourth polishing units 22A to 22D are determined as the processes that are capable of being performed simultaneously. The substrate supply process PT1 and the substrate discharge process PT10 performed by the supply/discharge robot 211 are determined as processes that are incapable of being performed simultaneously. The pre-polishing transfer process PT3 and the post-polishing transfer process PT6 performed by the transfer robot 243 are determined as processes that are incapable of being performed simultaneously.

Further, as the transfer processing priority condition, it is determined that the pre-polishing transfer process PT3 is prioritized over the post-polishing transfer process PT6. At this time, not only the start timings of the pre-polishing transfer process PT3 and the post-polishing transfer process PT6, but also the end timings may be considered.

Figure 16:
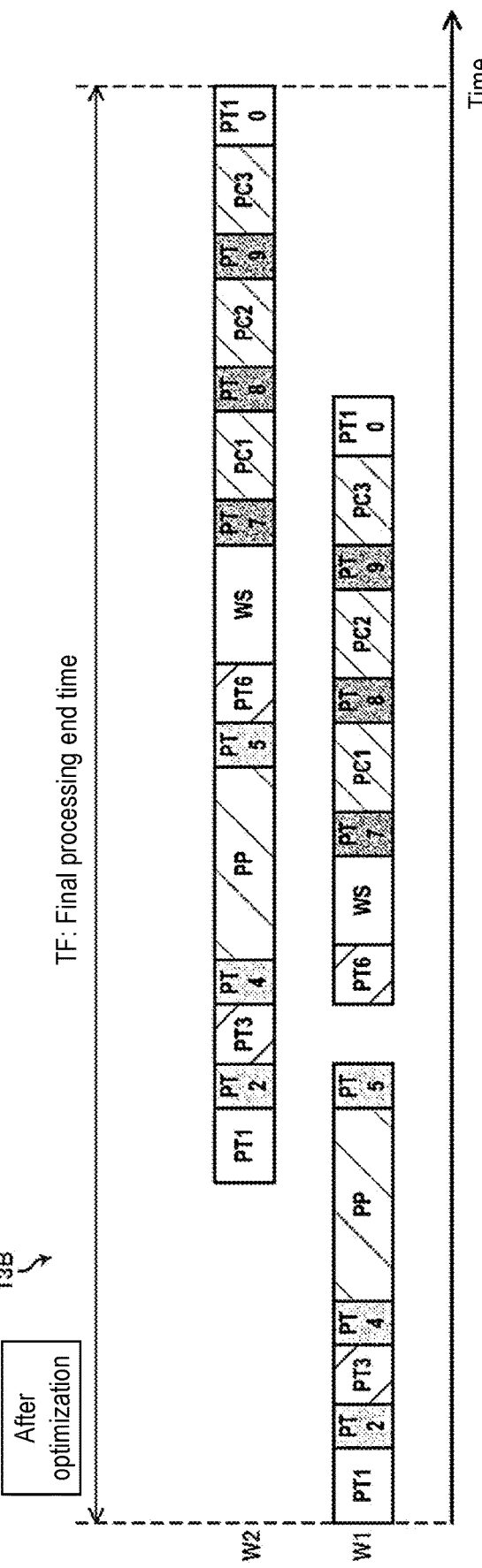
FIG. 16 is a diagram showing an example of the substrate processing schedule 13B after mathematical optimization generated by a schedule generation part 302.

FIG. 16 is a diagram showing an example of the substrate processing schedule 13B after the mathematical optimization generated by the schedule generation part 302. The substrate processing schedule 13B shown in FIG. 16 is generated using the mathematical optimization by the schedule generation part 302. Comparing the substrate processing schedule 13B after the mathematical optimization with the substrate processing schedule 13A before the mathematical optimization shown in FIG. 15, according to the transfer processing priority condition, the pre-polishing transfer process PT3 for a second wafer W2 is executed with priority over the post-polishing transfer process PT6 for a first wafer W1, and the start order and the start timings of the respective processes have been modified. This prevents standby for the start of the pre-polishing transfer process PT3 until the post-polishing transfer process PT6 is completed, and since the wafers W are transported to the polishing units 22A to 22D in a timely manner, the evaluation index 14 of the substrate processing schedule 13A is improved.

Note that the schedule generation part 302 may consider the post-polishing finishing start time TW from the end timing of the polishing process PP to the start timing of the finishing process PC1 of the most upstream process and perform mathematical optimization.

Figure 17:
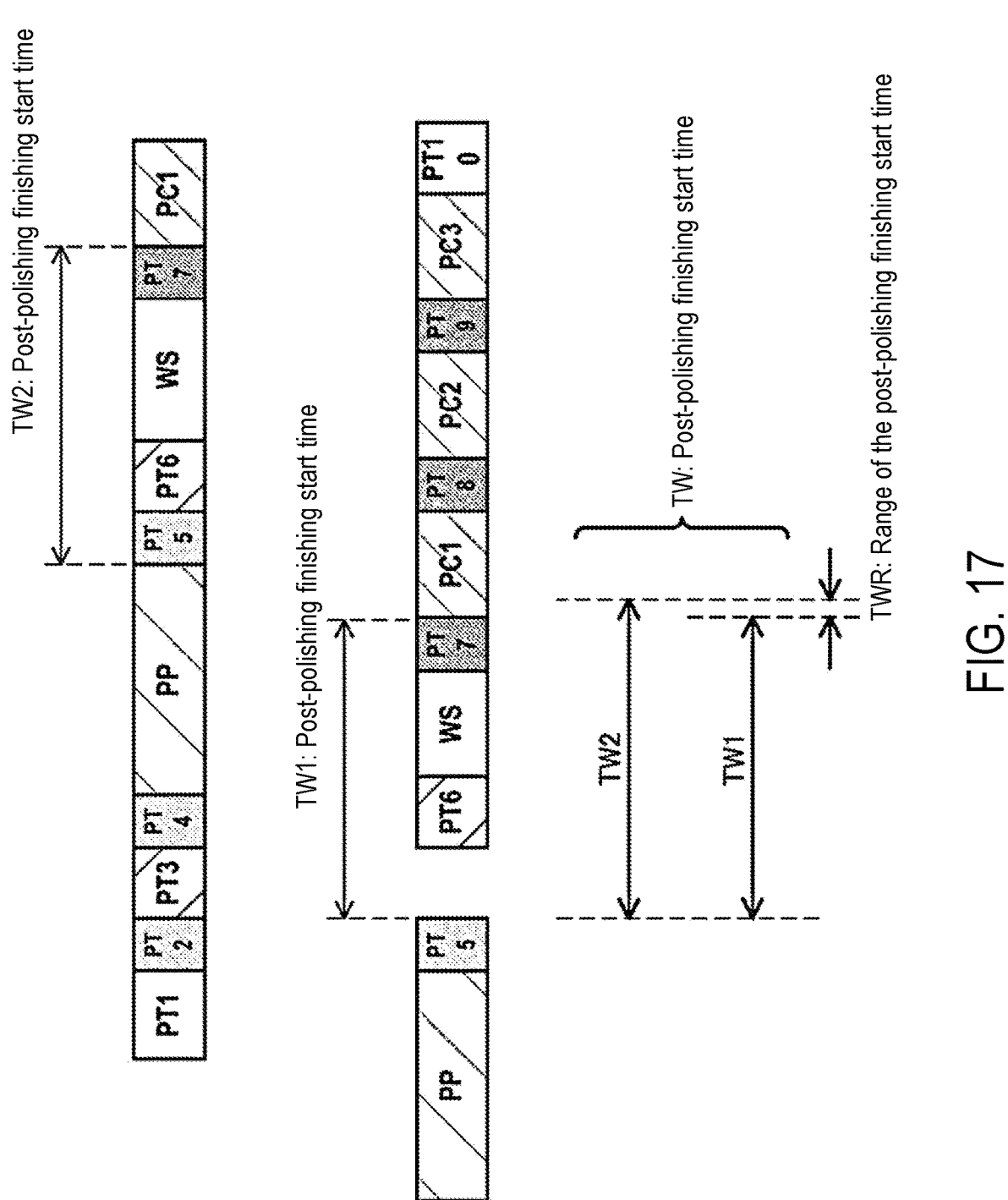
FIG. 17 is a diagram showing an example of post-polishing finishing start time TW and a range TWR thereof.

FIG. 17 is a diagram showing an example of post-polishing finishing start time TW and a range TWR thereof. In the substrate processing schedule 13B, as shown in FIG. 17, post-polishing finishing start time TW1 and TW2 for the two wafers W are determined, respectively. The range TWR of the post-polishing finishing start time TW1 and TW2 is determined, for example, as the difference value between the post-polishing finishing start time TW1 and TW2.

For example, the schedule generation part 302 may further set a post-polishing finishing start range condition which determines the range TWR of the post-polishing finishing start time TW as the constraint condition and perform the mathematical optimization. If the range TWR of the post-polishing finishing start time TW is determined to be within 1 second, for example, the substrate processing schedule 13 is generated so that the difference between the minimum value and the maximum value is within 1 second. As a result, when automatic operation is performed on multiple wafers W, variation in the post-polishing finishing start time TW among the wafers W may be suppressed, and the post-polishing finishing start time TW may be uniformized.

Furthermore, the schedule generation part 302 may further set the total value, average value, or maximum value of the post-polishing finishing start time TW being the shortest as the objective function and perform the mathematical optimization. In that case, for example, the objective function may be defined by combining the minimization of the final processing end time TF and the minimization of the post-polishing finishing start time TW using a weighting coefficient or the like. As a result, when automatic operation is performed on multiple wafers W, the standby time from when the polishing process PP is performed until the finishing process PC is performed may be reduced. Furthermore, the schedule generation part 302 may further set the degree of variation (for example, standard deviation, variance, difference value between maximum value and minimum value, etc.) in the post-polishing finishing start time TW being the smallest as the objective function and perform the mathematical optimization.

The schedule evaluation part 303 evaluates the substrate processing schedule 13 generated by the schedule generation part 302 based on predetermined evaluation criteria, and calculates an evaluation index 14 of the substrate processing schedule 13 as the evaluation result. The evaluation index 14 of the substrate processing schedule 13 includes at least one of the number of wafers W processed per unit time (WPH), the takt time of the respective processes, the rate-limiting process that requires the longest processing time among the respective processes, and the degree of variation in the post-polishing finishing start time TW.

The number of wafers W processed per unit time (WPH) is calculated by dividing the final processing end time TF by the number of wafers processed. As the takt time of the respective processes, the takt time of the polishing process PP and the finishing processes PC1 to PC3 is calculated. As the degree of variation in the post-polishing finishing start time TW, for example, the standard deviation, the variance, and the difference value between the maximum value and the minimum value are calculated.

The output processing part 304 performs the output process for outputting the substrate processing schedule 13 generated by the schedule generation part 302 and the evaluation index 14 calculated by the schedule evaluation part 303. For example, the output processing unit 304 may display and output the substrate processing schedule 13 and the evaluation index 14 through the output part 34, or may store the substrate processing schedule 13 and the evaluation index 14 in the storage part 32. Further, the output processing part 304 may transmit the substrate processing schedule 13 to the substrate processing device 2 through the communication part 31, and the substrate processing device 2 may automatically operate according to the substrate processing schedule 13. Further, the output processing part 304 may transmit the start timings of the respective processes to the substrate processing schedule 13 based on the substrate processing schedule 13, and the substrate processing device 2 may automatically operate according to the start timings.

(Information Processing Method)

Figure 18:
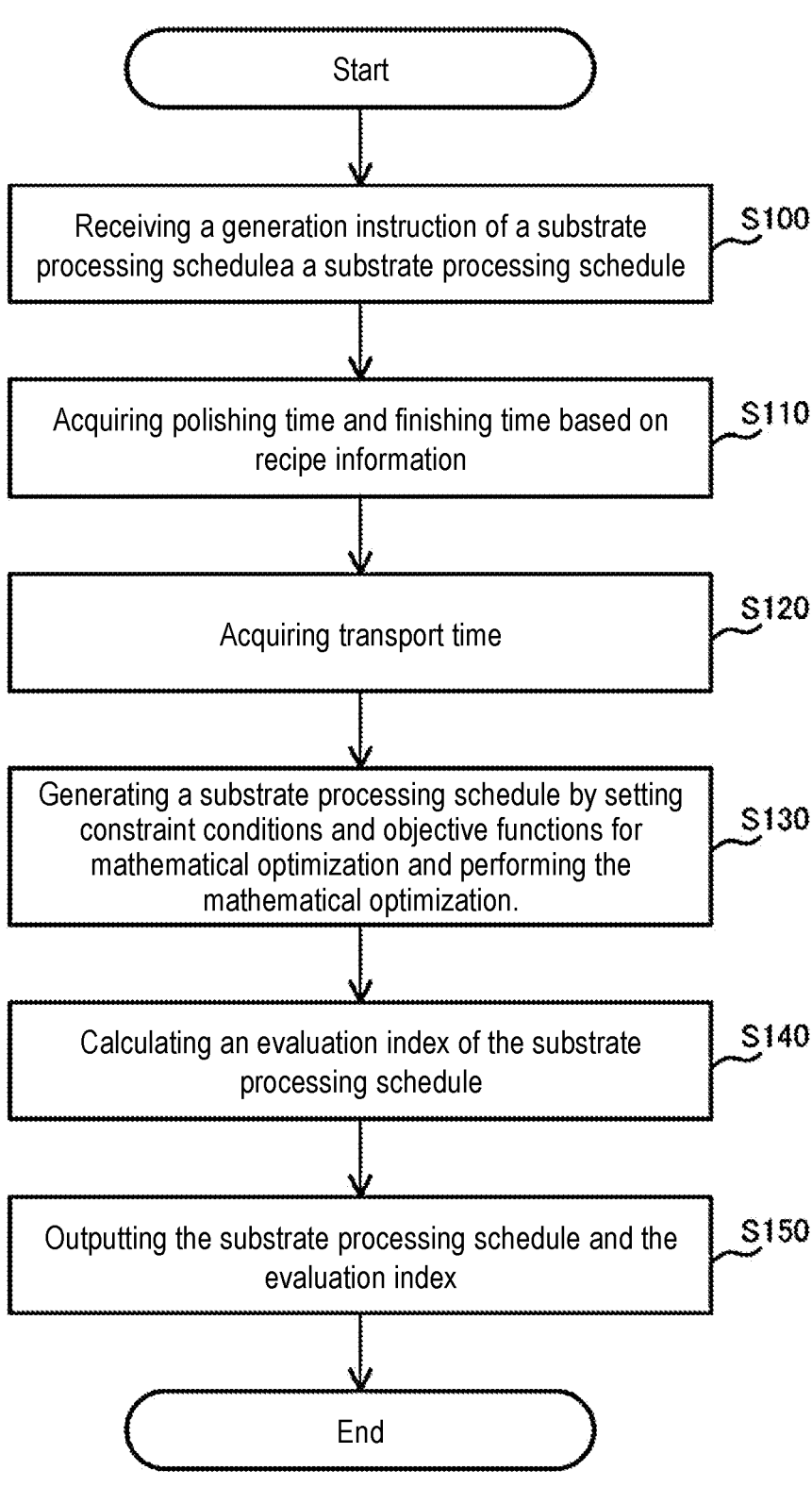
FIG. 18 is a flowchart showing an example of an information processing method performed by the information processing device 3.

FIG. 18 is a flowchart showing an example of an information processing method performed by the information processing device 3 according to the embodiment.

First, in step S100, the user, for example, instructs the generation conditions (for example, the lot number of the wafer W as the target of automatic operation, the model number of the substrate processing device 2 that performs automatic operation, the processing number of wafers, etc.) of the substrate processing schedule 13 on the substrate processing optimization screen displayed on the information processing device 3, and instructs a generation start of the substrate processing schedule 13. Accordingly, the information processing device 3 receives the input operation.

Next, in step S110, the substrate processing time acquisition part 300 acquires the recipe information 11 according to the input operation received in step S100, and acquires the polishing time TP required for the polishing process PP and the finishing time TC required for the finishing process PC based on the recipe information 11. For example, in the case where the lot number is instructed, the polishing time TP and the finishing time TC are acquired based on the recipe information 11 associated with the lot number.

Next, in step S120, the transport processing time acquisition part 301 acquires the transport time information 12 according to the input operation received in step S100. For example, in the case where the lot number is instructed, the transport time information 12 associated with the lot number is acquired.

Next, in step S130, the schedule generation part 302 generates the substrate processing schedule 13 by setting a processing order condition, a simultaneous processing condition, a transfer processing priority condition, and a post-polishing finishing start range condition as constraint conditions for mathematical optimization, setting the minimization of the final processing end time TF which includes the polishing time TP and the finishing time TC acquired in step S110 and the transport time TT indicated by the transport time information 12 acquired in step S110 as variables and the minimization of the post-polishing finishing start time TW as objective functions of the mathematical optimization, and performing the mathematical optimization.

Next, in step S140, the schedule evaluation part 303 calculates the evaluation index 14 of the substrate processing schedule 13 based on the substrate processing schedule 13 generated in step S130.

Then, in step S150, the output processing part 304 performs the output process for outputting the substrate processing schedule 13 generated in step S130 and the evaluation index 14 calculated in step S140, and the series of an information processing learning method shown in FIG. 18 is completed. In the above information processing method, step S110 corresponds to a substrate processing time acquisition process, step S120 corresponds to a transport time acquisition process, step S130 corresponds to a schedule generation process, step S140 corresponds to a schedule evaluation process, and step S150 corresponds to an output processing process.

As described above, according to the information processing device 3 and the information processing method according to the embodiment, the schedule generation part 302 generates the substrate processing schedule 13 by setting the processing order condition, the simultaneous processing condition, the transfer processing priority condition which specifies that the pre-polishing transfer process PT3 is prioritized over the post-polishing transfer process PT6 as the constraint conditions for mathematical optimization based on the recipe information 11 and the transport time information 12, setting the final processing end time TF being the shortest as the objective function of mathematical optimization, and performing mathematical optimization which determines the start timings of the respective processes. Therefore, as the transport processes which are incapable of being executed simultaneously due to the device configuration of the transport unit, even if the pre-polishing transfer process PT3 and the post-polishing transfer process PT6 performed by the transfer robot 243 are included, the substrate processing schedule 13 reflects the transfer processing priority condition which specifies that the pre-polishing transfer processing PT3 is prioritized over the post-polishing transfer processing PT6, and the substrate processing schedule 13 can be appropriately generated.

OTHER EMBODIMENTS

The disclosure is not limited to the embodiments described above, and can be implemented with various modifications without departing from the spirit of the disclosure. All of modifications still fall within the technical idea of the disclosure.

In the above embodiments, the substrate processing device 2 and the information processing device 3 are described as being configured as separate devices. However, the substrate processing device 2 and the information processing device 3 may be formed by a single device, for example, the information processing device 3 may be incorporated into the control unit 25 of the substrate processing device 2.

In the above embodiments, the substrate processing device 2 has been described as performing a chemical mechanical polishing process as the polishing process, but the substrate processing device 2 may perform a physical mechanical polishing process in place of a chemical mechanical polishing process. Furthermore, although the substrate processing device 2 has been described as one that performs the polishing process and the finishing process on the wafer W as the substrate process, the substrate processing device 2 may perform either the polishing process or the finishing process, or may perform another substrate process in place of or in addition to the polishing process and the finishing process.

In the above embodiments, the substrate processing device 2, as shown in FIG. 2, the case has been described in which the respective substrate processing units (the polishing unit and the finishing unit) and the respective transport processing units are provided. On the other hand, as the configuration of the substrate processing device 2, the number, disposition, upstream/downstream relationship, parallel relationship, and series relationship of the respective substrate processing units and the respective transport processing units are not limited to the example of FIG. 2, and may be modified as appropriate. For example, the number of polishing units may be one or more, and the number of finishing units may be one or more. In addition, as the number of transport processing units, the number of supply/discharge robots may be one or more, the number of first to third transfer robots may be one or more, and the number of transfer robots may be one or more. In addition, the respective substrate processing units, the position at which the wafer W is delivered between the respective transport processing units, the position at which the wafer W is temporarily placed on standby, etc. may be modified as appropriate, or the number thereof may be added as appropriate. In the above case, the constraint conditions, the objective function, and the decision variables for mathematical optimization in the schedule generation part 302 may be modified in accordance with the configuration of the respective substrate processing units and the respective transport processing units.

In the above embodiments, the configuration and the functions of the information processing device 3 have been described on the premise that the substrate processing device 2 includes the respective substrate processing units (the polishing unit and the finishing unit) and the respective transport processing units, as shown in FIG. 2. In contrast, the configuration and the functions of the information processing device 3 in the case where the substrate processing device 2 includes at least the following configuration will be described.

A substrate processing device performs a substrate process on a substrate, and includes one or more substrate processing units accessible to a substrate processing unit delivery position for delivering the substrate; a first transport unit which performs a pre-processing transport process that transports the substrate before the substrate process from a first transport start position to a first transport end position; a second transport unit which includes multiple transport mechanisms that perform a pre-processing loading process that transports the substrate before the substrate process from a transfer robot delivery position to the substrate processing unit delivery position and a post-processing unloading process that transports the substrate after the substrate process from the substrate processing unit delivery position to the transfer robot delivery position; a third transport unit which performs a post-processing transport process that transports the substrate after the substrate process from a third transport start position to a third transport end position; and a transfer robot which performs a pre-processing transfer process that receives the substrate before the substrate process from the first transport unit at the first transport end position and delivers the substrate before the substrate process to the second transport unit at the transfer robot delivery position and a post-processing transfer process that receives the substrate after the substrate process from the second transport unit at the transfer robot delivery position and delivers the substrate after the substrate process to the third transfer unit at the third transport start position.

The information processing device (information processing method) functions as a device (method) that generates a substrate processing schedule for sequentially performing respective processes on a predetermined number of substrates in the substrate processing device having the above configuration. Specifically, the information processing device (information processing method) includes a substrate processing time acquisition part (substrate processing time acquisition process) which acquires processing time required for the substrate process based on recipe information indicating the processing content of the substrate process; a transport processing time acquisition part (transport processing time acquisition process) which acquires the transport time required for each of a pre-processing transport process, a pre-processing transfer process, a pre-processing loading process, a post-processing unloading process, a post-processing transfer process, and a post-processing transport process; and a schedule generation part (schedule generation process) which generates a substrate processing schedule by setting a processing order condition which determines the order in which the respective processes are performed, a simultaneous processing condition which determines which processes are capable or incapable of being performed simultaneously among the respective processes, and a transfer processing priority condition which specifies that the pre-processing transfer process is prioritized over the post-processing transfer process as constraint conditions for mathematical optimization, setting the final processing end time of the final substrate that includes the processing time and the transport time as variables being the shortest as an objective function of the mathematical optimization, and performing the mathematical optimization which determines the start timings of the respective processes.

Note that the substrate processing device is a substrate processing device having the above configuration, and may also include a control unit which controls the operations of the substrate processing unit, the first to third transport units, and the transfer robot so that when sequentially performing the respective processes on a predetermined number of substrates, the pre-processing transfer process is prioritized over the post-processing transfer process.

What is claimed is:

1. An information processing device, generating a substrate processing schedule for sequentially performing respective processes on a predetermined number of substrates in a substrate processing device, the substrate processing device comprising:

one or more polishing units, performing a polishing process on the substrate and accessible to a polishing unit delivery position for delivering the substrate;

one or more finishing units, performing a finishing process on the substrate after the polishing process;

a first transport unit, performing a pre-polishing transport process that transports the substrate before the polishing process from a first transport start position to a first transport end position;

a second transport unit, comprising a plurality of transport mechanisms which perform a pre-polishing loading process that transports the substrate before the polishing process from a transfer robot delivery position to the polishing unit delivery position, and a post-polishing unloading process that transports the substrate after the polishing process from the polishing unit delivery position to the transfer robot delivery position;

a third transport unit, performing a post-polishing transport process that transports the substrate after the polishing process from a third transport start position to the finishing unit;

a supply/discharge robot, performing a substrate supply process that takes out the substrate before the polishing process from a substrate cassette and supplies the substrate before the polishing process to the first transport unit and a substrate discharge process that receives the substrate after the finishing process from the finishing unit and storing the substrate after the finishing process in the substrate cassette; and a transfer robot, performing a pre-polishing transfer process that receives the substrate before the polishing process from the first transport unit at the first transport end position and delivers the substrate before the polishing process to the second transport unit at the transfer robot delivery position and a post-polishing transfer process that receives the substrate after the polishing process from the second transport unit at the transfer robot delivery position and delivers the substrate after the polishing process to the third transport unit at the third transport start position, and the information processing device comprising:

a substrate processing time acquisition unit, acquiring polishing time required for the polishing process and finishing time required for the finishing process based on recipe information indicating processing content of the polishing process and the finishing process;

a transport processing time acquisition part, acquiring transport time required for each of the substrate supply process, the pre-polishing transport process, the pre-polishing transfer process, the pre-polishing loading process, the post-polishing unloading process, the post-polishing transfer process, the post-polishing transport process, and the substrate discharge process; and a schedule generation part, generating a substrate processing schedule by setting a processing order condition which determines order in which the respective processes are performed, a simultaneous processing condition which determines which processes are capable or incapable of being performed simultaneously among the respective processes, and a transfer processing priority condition which specifies that the pre-polishing transfer process is prioritized over the post-polishing transfer process as constraint conditions for mathematical optimization, setting final processing end time for the substrate of the last that comprises the polishing time, the finishing time, and the transport time as variables as an objective function of the mathematical optimization, and performing the mathematical optimization which determines start timings of the respective processes.

2. The information processing device according to claim 1, wherein the schedule generation part further sets a post-polishing finishing start range condition that determines a range of post-polishing finishing start time from an end timing of the polishing process to a start timing of the finishing process as the constraint condition and performs the mathematical optimization.

3. The information processing device according to claim 2, wherein the schedule generation part further sets a total value or an average value of the post-polishing finishing start time being the shortest as the objective function and performs the mathematical optimization.

4. The information processing device according to claim 1, further comprising:

a schedule evaluation part, evaluating the substrate processing schedule based on evaluation criteria predetermined, and the schedule evaluation part outputting at least one of a number of the substrates processed per unit time and a rate-limiting process that requires the longest processing time among the respective processes as an evaluation index when evaluating the substrate processing schedule based on the evaluation criteria.

5. An information processing device, generating a substrate processing schedule for sequentially performing respective processes on a predetermined number of substrates in a substrate processing device, the substrate processing device comprising:

one or more substrate processing units, performing a substrate process on the substrate and accessible to a substrate processing unit delivery position for delivering the substrate;

a first transport unit, performing a pre-processing transport process that transports the substrate before the substrate process from a first transport start position to a first transport end position;

a second transport unit, comprising a plurality of transport mechanisms which perform a pre-processing loading process that transports the substrate before the substrate process from a transfer robot delivery position to the substrate processing unit delivery position, and a post-processing unloading process that transports the substrate after the substrate process from the substrate processing unit delivery position to the transfer robot delivery position;

a third transport unit, performing a post-processing transport process that transports the substrate after the substrate process from a third transport start position to a third transport end position; and a transfer robot, performing a pre-processing transfer process that receives the substrate before the substrate process from the first transport unit at the first transport end position and delivers the substrate before the substrate process to the second transport unit at the transfer robot delivery position, and a post-processing transfer process that receives the substrate after the substrate process from the second transport unit at the transfer robot delivery position and delivers the substrate after the substrate process to the third transport unit at the third transport start position, and the information processing device comprising:

a substrate processing time acquisition part, acquiring processing time required for the substrate process based on recipe information indicating processing content of the substrate process;

a transport processing time acquisition part, acquiring transport time required for each of the pre-processing transport process, the pre-processing transfer process, the pre-processing loading process, the post-processing unloading process, the post-processing transfer process, and the post-processing transport process; and a schedule generation part, generating a substrate processing schedule by setting a processing order condition which determines order in which the respective processes are performed, a simultaneous processing condition which determines which processes are capable or incapable of being performed simultaneously among the respective processes, and a transfer processing priority condition which specifies that the pre-processing transfer process is prioritized over a post-processing transfer process as constraint conditions for mathematical optimization, setting final processing end time for the substrate of the last that comprises the processing time and the transport time as variables as an objective function of the mathematical optimization, and performing the mathematical optimization which determines start timings of the respective processes.

6. A substrate processing device, comprising:

one or more substrate processing units, performing a substrate process on a substrate and accessible to a substrate processing unit delivery position for delivering the substrate;

a first transport unit, performing a pre-processing transport process that transports the substrate before the substrate process from a first transport start position to a first transport end position;

a second transport unit, comprising a plurality of transport mechanisms which perform a pre-processing loading process that transports the substrate before the substrate process from a transfer robot delivery position to the substrate processing unit delivery position, and a post-processing unloading process that transports the substrate after the substrate process from the substrate processing unit delivery position to the transfer robot delivery position;

a third transport unit, performing a post-processing transport process that transports the substrate after the substrate process from a third transport start position to a third transport end position;

a transfer robot, performing a pre-processing transfer process that receives the substrate before the substrate process from the first transport unit at the first transport end position and delivers the substrate before the substrate process to the second transport unit at the transfer robot delivery position, and a post-processing transfer process that receives the substrate after the substrate process from the second transport unit at the transfer robot delivery position and delivers the substrate after the substrate process to the third transfer unit at the third transport start position; and a control unit, controlling operations of the substrate processing unit, the first to third transfer units, and the transfer robot so that when sequentially performing the respective processes on a predetermined number of the substrates, the pre-processing transfer process is prioritized over the post-processing transfer process.

7. An information processing method, generating a substrate processing schedule for sequentially performing respective processes on a predetermined number of substrates in a substrate processing device, the substrate processing device comprising:

one or more polishing units, performing a polishing process on the substrate and accessible to a polishing unit delivery position for delivering the substrate;

one or more finishing units, performing a finishing process on the substrate after the polishing process;

a first transport unit, performing a pre-polishing transport process that transports the substrate before the polishing process from a first transport start position to a first transport end position;

a second transport unit, comprising a plurality of transport mechanisms which perform a pre-polishing loading process that transports the substrate before the polishing process from a transfer robot delivery position to the polishing unit delivery position, and a post-polishing unloading process that transports the substrate after the polishing process from the polishing unit delivery position to the transfer robot delivery position;

a third transport unit, performing a post-polishing transport process that transports the substrate after the polishing process from a third transport start position to the finishing unit;

a supply/discharge robot, performing a substrate supply process that takes out the substrate before the polishing process from a substrate cassette and supplies the substrate before the polishing process to the first transport unit and a substrate discharge process that receives the substrate after the finishing process from the finishing unit and storing the substrate after the finishing process in the substrate cassette; and a transfer robot, performing a pre-polishing transfer process that receives the substrate before the polishing process from the first transport unit at the first transport end position and delivers the substrate before the polishing process to the second transport unit at the transfer robot delivery position and a post-polishing transfer process that receives the substrate after the polishing process from the second transport unit at the transfer robot delivery position and delivers the substrate after the polishing process to the third transport unit at the third transport start position, and the information processing method comprising:

a substrate processing time acquisition process, acquiring polishing time required for the polishing process and finishing time required for the finishing process based on recipe information indicating processing content of the polishing process and the finishing process;

a transport processing time acquisition process, acquiring transport time required for each of the substrate supply process, the pre-polishing transport process, the pre-polishing transfer process, the pre-polishing loading process, the post-polishing unloading process, the post-polishing transfer process, the post-polishing transport process, and the substrate discharge process; and a schedule generation process, generating a substrate processing schedule by setting a processing order condition which determines order in which the respective processes are performed, a simultaneous processing condition which determines which processes are capable or incapable of being performed simultaneously among the respective processes, and a transfer processing priority condition which specifies that the pre-polishing transfer process is prioritized over the post-polishing transfer process as constraint conditions for mathematical optimization, setting final processing end time for the substrate of the last that comprises the polishing time, the finishing time, and the transport time as variables as an objective function of the mathematical optimization, and performing the mathematical optimization which determines start timings of the respective processes.

8. An information processing method, generating a substrate processing schedule for sequentially performing respective processes on a predetermined number of substrates in a substrate processing device, the substrate processing device comprising:

one or more substrate processing units, performing a substrate process on the substrate and accessible to a substrate processing unit delivery position for delivering the substrate;

a first transport unit, performing a pre-processing transport process that transports the substrate before the substrate process from a first transport start position to a first transport end position;

a second transport unit, comprising a plurality of transport mechanisms which perform a pre-processing loading process that transports the substrate before the substrate process from a transfer robot delivery position to the substrate processing unit delivery position, and a post-processing unloading process that transports the substrate after the substrate process from the substrate processing unit delivery position to the transfer robot delivery position;

a third transport unit, performing a post-processing transport process that transports the substrate after the substrate process from a third transport start position to a third transport end position; and a transfer robot, performing a pre-processing transfer process that receives the substrate before the substrate process from the first transport unit at the first transport end position and delivers the substrate before the substrate process to the second transport unit at the transfer robot delivery position, and a post-processing transfer process that receives the substrate after the substrate process from the second transport unit at the transfer robot delivery position and delivers the substrate after the substrate process to the third transport unit at the third transport start position, and the information processing method comprising:

a substrate processing time acquisition process, acquiring processing time required for the substrate process based on recipe information indicating processing content of the substrate process;

a transport processing time acquisition process, acquiring transport time required for each of the pre-processing transport process, the pre-processing transfer process, the pre-processing loading process, the post-processing unloading process, the post-processing transfer process, and the post-processing transport process; and a schedule generation process, generating a substrate processing schedule by setting a processing order condition which determines order in which the respective processes are performed, a simultaneous processing condition which determines which processes are capable or incapable of being performed simultaneously among the respective processes, and a transfer processing priority condition which specifies that the pre-processing transfer process is prioritized over a post-processing transfer process as constraint conditions for mathematical optimization, setting final processing end time for the substrate of the last that comprises the processing time and the transport time as variables as an objective function of the mathematical optimization, and performing the mathematical optimization which determines start timings of the respective processes.

\* \* \* \* \*